United States Patent
Sugiyama et al.

(10) Patent No.: US 10,560,642 B2
(45) Date of Patent: Feb. 11, 2020

(54) IMAGE PROCESSING DEVICE, IMAGE PROCESSING METHOD AND IMAGING DEVICE

(71) Applicant: SONY SEMICONDUCTOR SOLUTIONS CORPORATION, Kanagawa (JP)

(72) Inventors: Toshinobu Sugiyama, Kanagawa (JP); Yasushi Sato, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 125 days.

(21) Appl. No.: 15/576,645

(22) PCT Filed: May 25, 2016

(86) PCT No.: PCT/JP2016/065420
§ 371 (c)(1),
(2) Date: Nov. 22, 2017

(87) PCT Pub. No.: WO2016/199573
PCT Pub. Date: Dec. 15, 2016

(65) Prior Publication Data
US 2018/0146144 A1 May 24, 2018

(30) Foreign Application Priority Data

Jun. 8, 2015 (JP) ................................ 2015-115384

(51) Int. Cl.
*H04N 5/33* (2006.01)
*H04N 5/353* (2011.01)
*H04N 5/374* (2011.01)

(52) U.S. Cl.
CPC ............. *H04N 5/33* (2013.01); *H04N 5/3532* (2013.01); *H04N 5/374* (2013.01)

(58) Field of Classification Search
CPC ......... H04N 5/33; H04N 5/374; H04N 5/3532
(Continued)

(56) References Cited

U.S. PATENT DOCUMENTS

2007/0183657 A1* 8/2007 Kidono ................ G06K 9/2018
382/162
2008/0218597 A1* 9/2008 Cho ..................... H04N 5/2351
348/222.1
(Continued)

FOREIGN PATENT DOCUMENTS

CN 103929628 A 7/2014
JP 2007-184805 A 7/2007
(Continued)

OTHER PUBLICATIONS

International Search Report and Written Opinion of PCT Application No. PCT/JP2016/065420, dated Aug. 16, 2016, 09 pages of ISRWO.

*Primary Examiner* — On S Mung
(74) *Attorney, Agent, or Firm* — Chip Law Group

(57) ABSTRACT

Provided is an image processing device for improving quality of an image generated using an image obtained when infrared light is radiated and an image obtained when infrared light is not radiated. A modulation coefficient setting unit sets a first modulation coefficient used for correction of infrared luminance information of an infrared image obtained when infrared light is radiated. The first modulation coefficient is set on the basis of a ratio between the infrared luminance information and visible luminance information of a visible image obtained when the infrared light is not radiated. A modulation coefficient correcting unit corrects the first modulation coefficient to a second modulation coefficient on the basis of a parameter indicating brightness of a subject of the visible image or brightness of a photographing environment. A luminance correcting unit corrects the infrared luminance information using the second modulation coefficient.

20 Claims, 22 Drawing Sheets

(58) Field of Classification Search
USPC .......................................................... 348/164
See application file for complete search history.

(56) References Cited

U.S. PATENT DOCUMENTS

| | | |
|---|---|---|
| 2011/0063451 A1 | 3/2011 | Kamon et al. |
| 2013/0002882 A1 | 1/2013 | Onozawa et al. |
| 2014/0192202 A1 | 7/2014 | Sano et al. |

FOREIGN PATENT DOCUMENTS

| | | |
|---|---|---|
| JP | 2010-161459 A | 7/2010 |
| JP | 2011-233983 A | 11/2011 |
| JP | 5168353 B2 | 3/2013 |
| JP | 2013-081245 A | 5/2013 |
| JP | 2014-135627 A | 7/2014 |
| WO | 2009/133931 A1 | 11/2009 |
| WO | 2011/132241 A1 | 10/2011 |

* cited by examiner

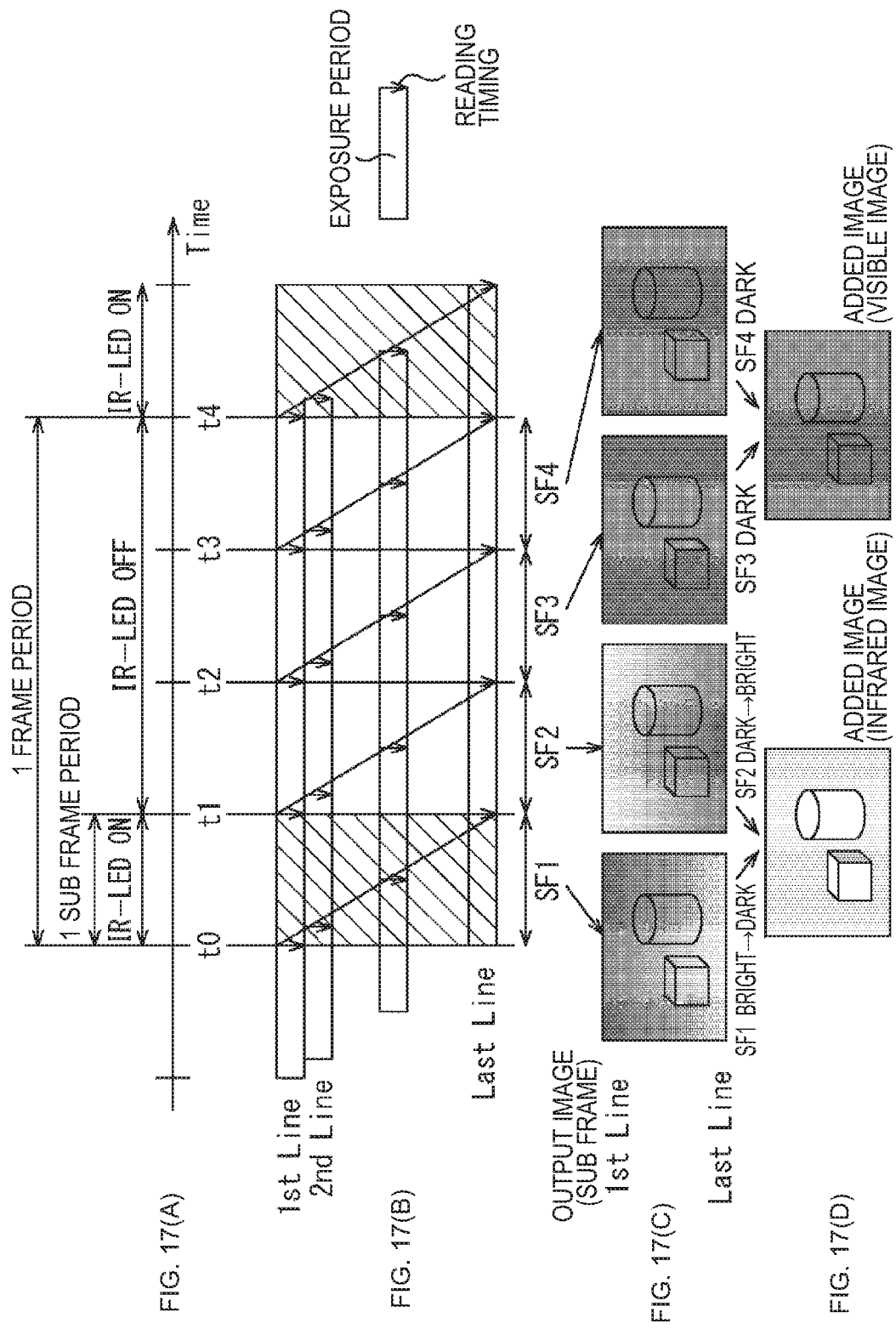

IMAGE PROCESSING DEVICE, IMAGE PROCESSING METHOD AND IMAGING DEVICE

CROSS REFERENCE TO RELATED APPLICATIONS

This application is a U.S. National Phase of International Patent Application No. PCT/JP2016/065420 filed on May 25, 2016, which claims priority benefit of Japanese Patent Application No. JP 2015-115384 filed in the Japan Patent Office on Jun. 8, 2015. Each of the above-referenced applications is hereby incorporated herein by reference in its entirety.

TECHNICAL FIELD

The present disclosure relates to an image processing device, an image processing method, a program, and an imaging device, and more particularly to an image processing device, an image processing method, a program, and an imaging device, which are capable of improving the quality of an image generated using an image obtained in a state in which infrared light is radiated and an image obtained in a state in which infrared light is not radiated.

BACKGROUND ART

Since the past, there have been monitoring cameras with two types of modes, that is, a day mode in which imaging is performed under daytime natural light or under illumination of visible light such as white light and a night mode in which imaging is performed by radiating infrared light.

In imaging in the day mode, it is possible to obtain color images. On the other hand, in imaging in the night mode, since reflected light of radiated infrared light reflected by a subject is received, color information such as R, and B is unable to be obtained, and only received light intensity of the reflected light (infrared light) is able to be acquired. Therefore, the obtained image is a monochrome image such as a gray image or a green image.

Meanwhile, considering the intended purpose of the monitoring camera, it is desirable to obtain a color image even in the imaging in the night mode.

In this regard, in the past, for example, a technique of consecutively capturing an image obtained in a state in which an imaging range (subject) is irradiated with infrared light (hereinafter referred to as an "infrared image") and an image obtained in a state in which an imaging range is not irradiated with infrared light (hereinafter referred to as a "visible image") and generating a color image using luminance information of the infrared image and chrominance information of the visible image has been disclosed (for example, see Non-Patent Literature 1).

CITATION LIST

Non-Patent Literature

Non-Patent Literature 1: "Color image generation of low illuminance scene using infrared flash and one camera," Meeting on Image Recognition and Understanding (MIRU 2011), P1034.

DISCLOSURE OF INVENTION

Technical Problem

Meanwhile, in the case in which the color image is generated using the luminance information of the infrared image and the chrominance information of the visible image, when the luminance information of the infrared image is used for the color image without change, in a subject in which reflectance of the infrared light and reflectance of the visible light are greatly different, color reproduction deteriorates due to a difference in luminance information. For example, in a case in which black clothing having high reflectance for infrared light and low reflectance for visible light is photographed, if the luminance information of the infrared image is used without change, the black clothing may look like whitish clothing in the color image.

The present disclosure was made in light of the foregoing, and it is desirable to improve the quality of an image generated using an image obtained in a state in which infrared light is radiated and an image obtained in a state in which infrared light is not radiated.

Solution to Problem

According to a first aspect of the present disclosure, an image processing device includes: a modulation coefficient setting unit configured to set a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated; a modulation coefficient correcting unit configured to correct the first modulation coefficient to a second modulation coefficient on the basis of a parameter indicating brightness of a subject of the visible image or brightness of a photographing environment; and a luminance correcting unit configured to correct the infrared luminance information using the second modulation coefficient.

The modulation coefficient correcting unit can calculate the second modulation coefficient by synthesizing the first modulation coefficient with a third modulation coefficient in a case in which the infrared luminance information is not corrected, with a ratio based on the parameter.

The modulation coefficient correcting unit can convert the first modulation coefficient into the second modulation coefficient through a predetermined non-linear function in a case in which the brightness of the subject of the visible image or the brightness of the photographing environment is determined to be less than a predetermined threshold value on the basis of the parameter.

The modulation coefficient correcting unit can calculate the second modulation coefficient by synthesizing a third modulation coefficient obtained by converting the first modulation coefficient through a predetermined first function with a fourth modulation coefficient obtained by converting the first modulation coefficient through a predetermined second function, with a ratio based on the parameter.

The modulation coefficient correcting unit can select a combination of the first function and the second function from among a plurality of functions on the basis of the parameter.

The plurality of functions can include a predetermined non-linear function and at least one of a function in which the fourth modulation coefficient is equal to the first modulation coefficient and a function in which the modulation coefficient is 1.

The modulation coefficient correcting unit can limit a lower limit value of the second modulation coefficient on the basis of the parameter in a case in which the brightness of the subject of the visible image or the brightness of the photographing environment is determined to be less than a predetermined threshold value on the basis of the parameter.

The modulation coefficient correcting unit can limit an upper limit value of the second modulation coefficient on the basis of the parameter in a case in which the visible luminance information is larger than the infrared luminance information.

The parameter can be a gain adjusted by exposure control for the visible image.

The parameter can be a measured value of the brightness of the subject of the visible image or the brightness of the photographing environment.

The modulation coefficient setting unit can set the first modulation coefficient on the basis of a ratio between a low frequency component of the infrared luminance information and a low frequency component of the visible luminance information.

A chrominance correcting unit configured to correct the chrominance information using the second modulation coefficient can be further included. The color correcting unit can convert the corrected infrared luminance information and the corrected chrominance information into the color information of the color image.

An infrared image converting unit configured to extract the infrared luminance information from the infrared image; and a visible image converting unit configured to extract the visible luminance information from the visible image can be further included.

According to the first aspect of the present disclosure, an image processing method includes: a modulation coefficient setting step of setting a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated; a modulation coefficient correcting step of correcting the first modulation coefficient to a second modulation coefficient on the basis of a parameter indicating brightness of a subject of the visible image or brightness of a photographing environment; and a luminance correcting step of correcting the infrared luminance information using the second modulation coefficient.

According to the first aspect of the present disclosure, a program causes a computer to execute processing including: a modulation coefficient setting step of setting a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated; a modulation coefficient correcting step of correcting the first modulation coefficient to a second modulation coefficient on the basis of a parameter indicating brightness of a subject of the visible image or brightness of a photographing environment; and a luminance correcting step of correcting the infrared luminance information using the second modulation coefficient.

In the first aspect of the present disclosure, a first modulation coefficient used for correction of infrared luminance information, which is luminance information of an infrared image obtained in a state in which infrared light is radiated, is set on the basis of a ratio between the infrared luminance information and visible luminance information, which is luminance information of a visible image obtained in a state in which the infrared light is not radiated; the first modulation coefficient is corrected to a second modulation coefficient on the basis of a parameter indicating brightness of a subject of the visible image or brightness of a photographing environment; and the infrared luminance information is corrected using the second modulation coefficient.

According to a second aspect of the present disclosure, an imaging device includes: an imaging element; an infrared light irradiation control unit configured to perform control such that irradiation of an imaging range with infrared light is turned on or off; a modulation coefficient setting unit configured to set a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated; a modulation coefficient correcting unit configured to correct the first modulation coefficient to a second modulation coefficient on the basis of a parameter indicating brightness of a subject of the visible image or brightness of a photographing environment; and a luminance correcting unit configured to correct the infrared luminance information using the second modulation coefficient.

The imaging element can divide one frame period corresponding to a predetermined frame rate into three or more sub frame periods, and sweep pixel values corresponding to the entire screen through a focal plane reading system at intervals of the sub frame periods, to generate sub frame images which are equal in number to the sub frame periods in the one frame period, and the infrared light irradiation control unit can perform control such that the irradiation of the imaging range with the infrared light is turned on or off in units of the same time length unit as the sub frame period in the one frame period.

An infrared image generating unit configured to generate the infrared image from a plurality of sub frame images in which a period in which the infrared light is radiated is included in an exposure time; and a visible image generating unit configured to generate the visible image from a plurality of sub frame images in which a period in which the infrared light is radiated is not included in an exposure time can be further included.

A color image converting unit configured to convert the corrected infrared luminance information and chrominance information of the visible image into color information of a color image can be further included.

In the second aspect of the present disclosure, control is performed such that irradiation of an imaging range with infrared light is turned on or off; a first modulation coefficient used for correction of infrared luminance information, which is luminance information of an infrared image obtained in a state in which infrared light is radiated, is set on the basis of a ratio between the infrared luminance information and visible luminance information, which is luminance information of a visible image obtained in a state in which the infrared light is not radiated; the first modulation coefficient is corrected to a second modulation coefficient on the basis of a parameter indicating brightness of a subject of the visible image or brightness of a photographing environment; and the infrared luminance information is corrected using the second modulation coefficient.

Advantageous Effects of Invention

According to the first or second aspect of the present disclosure, it is possible to improve the quality of an image generated using an image obtained in a state in which infrared light is radiated and an image obtained in a state in which infrared light is not radiated.

Further, the effects described herein are not necessarily limited, and any effect described in the present disclosure may be included.

BRIEF DESCRIPTION OF DRAWINGS

FIGS. 17(A), (B), (C), and (D) are diagrams illustrating a second example of an imaging timing.

MODE(S) FOR CARRYING OUT THE INVENTION

Hereinafter, a best mode for carrying out the present disclosure (hereinafter referred to as an "embodiment") will be described in detail with reference to the accompanying drawings.

<Configuration Example of Imaging Device According to Embodiment of Present Disclosure>

Figure 1:
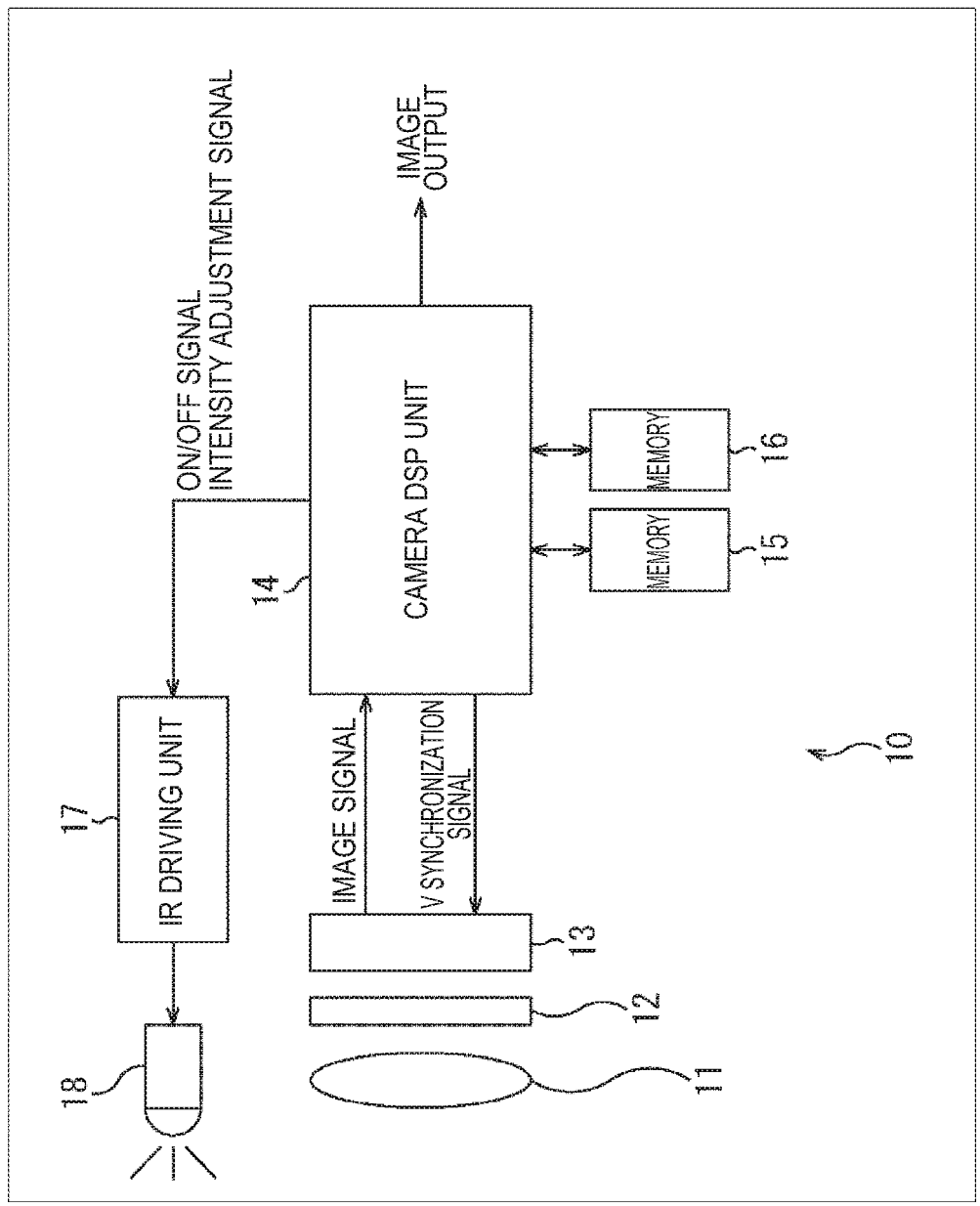
FIG. 1 is a block diagram illustrating a configuration example of an imaging device to which the present disclosure is applied.

FIG. 1 illustrates a configuration example of an imaging device according to an embodiment of the present disclosure.

This imaging device 10 is used for, for example, a monitoring camera or the like, and generates a color image on the basis of an infrared image obtained in a state in which infrared light is radiated and a visible image obtained with low illuminance in which infrared light is not radiated.

The imaging device 10 includes an imaging system having a configuration similar to a general camera, an image processing system that performs image processing, and a projection system that irradiates an imaging range with infrared light.

The imaging system of the imaging device 10 includes a lens 11, an IR band pass filter 12, and a CMOS image sensor 13 of a focal plane reading system (a rolling shutter system) (hereinafter abbreviated as "CMOS"). In the imaging system, the lens 11 condenses an optical image of a subject on the CMOS 13, the IR band pass filter 12 arranged between the lens 11 and the CMOS 13 extracts a visible light component and an infrared light component from the optical image of the subject, and the CMOS 13 generates an image signal based on incident light and outputs the image signal to the image processing system.

Figure 2:
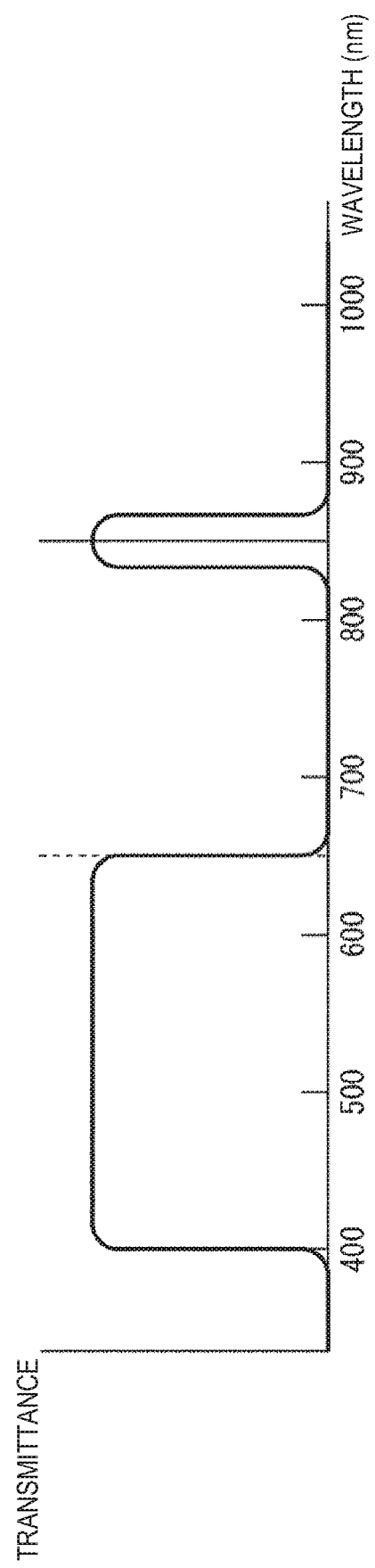
FIG. 2 is a diagram illustrating a transmission characteristic of an IR band pass filter.

FIG. 2 illustrates a transmission characteristic of the IR band pass filter 12. The IR band pass filter 12 has high transmittance for visible light having wavelengths of 400 nm to 650 nm and infrared light having a peak at a wavelength of 850 nm (infrared light radiated by the projection system).

Figure 3:
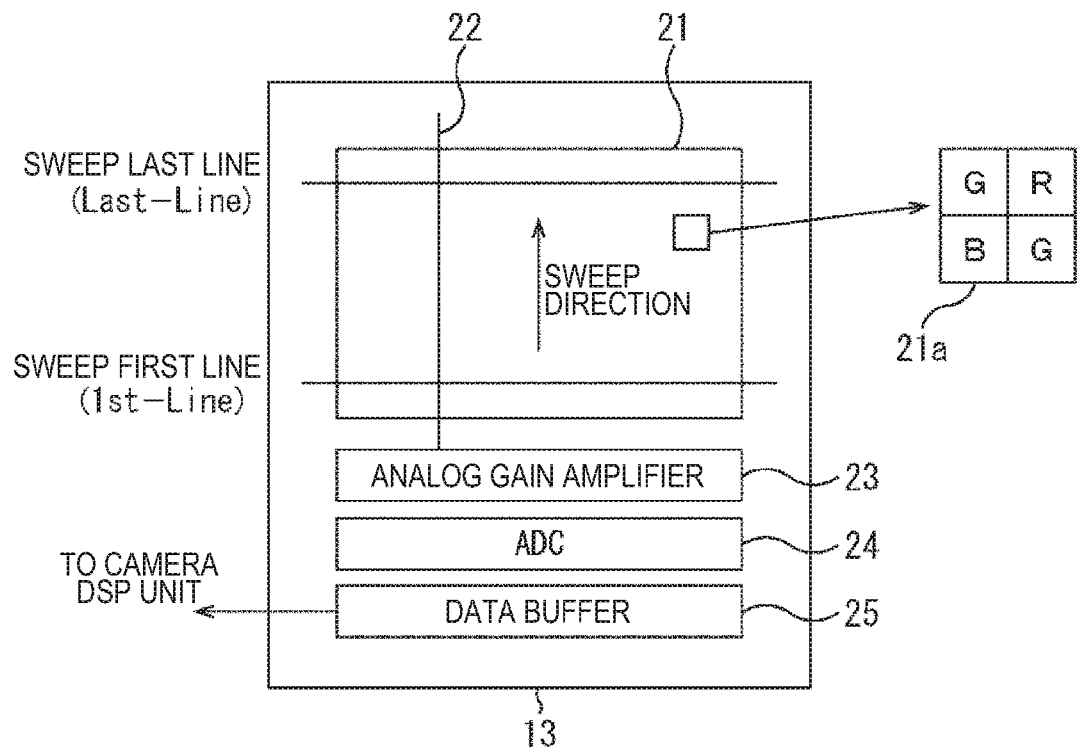
FIG. 3 is a block diagram illustrating a configuration example of a CMOS image sensor.

FIG. 3 illustrates a configuration example of the CMOS 13. The CMOS 13 includes a sensor array 21, a signal line 22, an analog gain amplifier 23, an ADC 24, and a data buffer 25. The sensor array 21 is configured with photoelectric conversion elements of pixels which are arranged vertically and horizontally, and a light receiving surface side of the sensor array 21 is covered with a color filter 21a of a Bayer array or the like.

Figure 4:
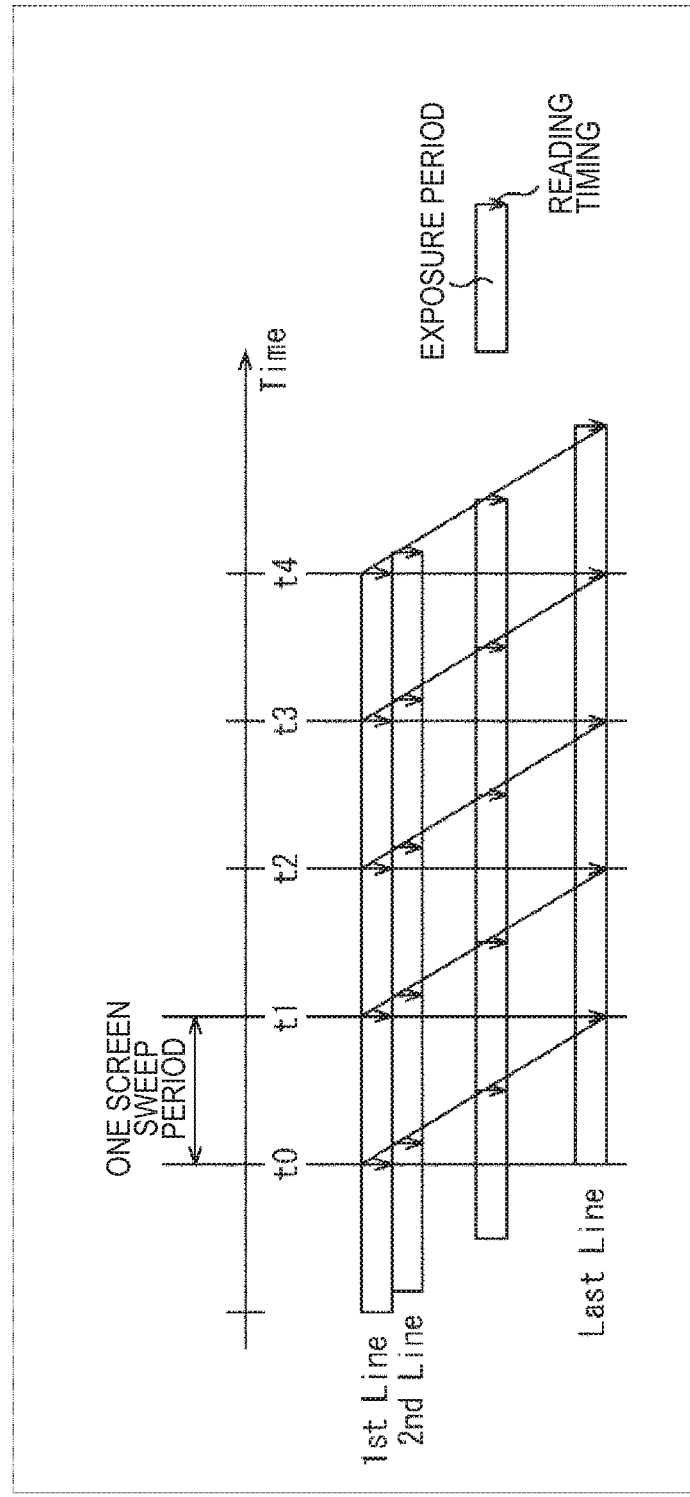
FIG. 4 is a block diagram illustrating a first configuration example of a camera DSP unit.

FIG. 4 illustrates exposure of each pixel time in the sensor array 21 of the CMOS 13 and a reading timing of a charge signal obtained thereby. As illustrated in FIG. 4, in the CMOS 13, an exposure period is shifted in units of lines in a sweep direction from a sweep start line (1st-Line) to a last line (Last-Line), and charge signals obtained during the exposure period are read out collectively for each line at a timing at which the exposure period ends.

The read charge signals are output to the analog gain amplifier 23 via the signal line 22, amplified, converted into digital pixel signals by the ADC 24, and stored in the data buffer 25. For example, a gain in the analog gain amplifier 23 can be adjusted (adaptively set) in accordance with brightness of the subject or brightness of a photographing environment through automatic exposure (AE) control. Then, pixel signals of all pixels constituting the sensor array 21 are output to the image processing system at a subsequent stage as an image signal. At this stage, the image signal is RAW data in which each pixel has color information of R, or B.

The description will now return to FIG. 1. The image processing system of the imaging device 10 includes a camera DSP unit 14 and frame memories 15 and 16. In the image processing system, the camera DSP unit 14 generates a color image in which each pixel has color information of R, or B on the basis of the image signal transferred from the imaging system. The image signal used for a noise reduction (NR) process is temporarily held in the frame memories 15 and 16. Further, the camera DSP unit 14 generates and outputs a V synchronization signal for controlling driving (exposure and reading) of the CMOS 13 of the imaging system. Furthermore, the camera DSP unit 14 generates and outputs a driver signal (an ON/OFF signal and an intensity adjustment signal) for controlling the projection system.

The projection system of the imaging device 10 includes an IR driving unit 17 and an IR irradiating unit 18. In the projection system, the IR driving unit 17 causes the IR irradiating unit 18 to radiate the infrared light in accordance with control of the camera DSP unit 14. The IR irradiating unit 18 irradiates the imaging range with infrared light having a peak at a wavelength of 850 nm. The IR irradiating unit 18 may be arranged in a housing of the imaging device 10 or may be arranged outside the housing of the imaging device 10.

<First Example of Imaging Timing of CMOS 13>

Figure 5:
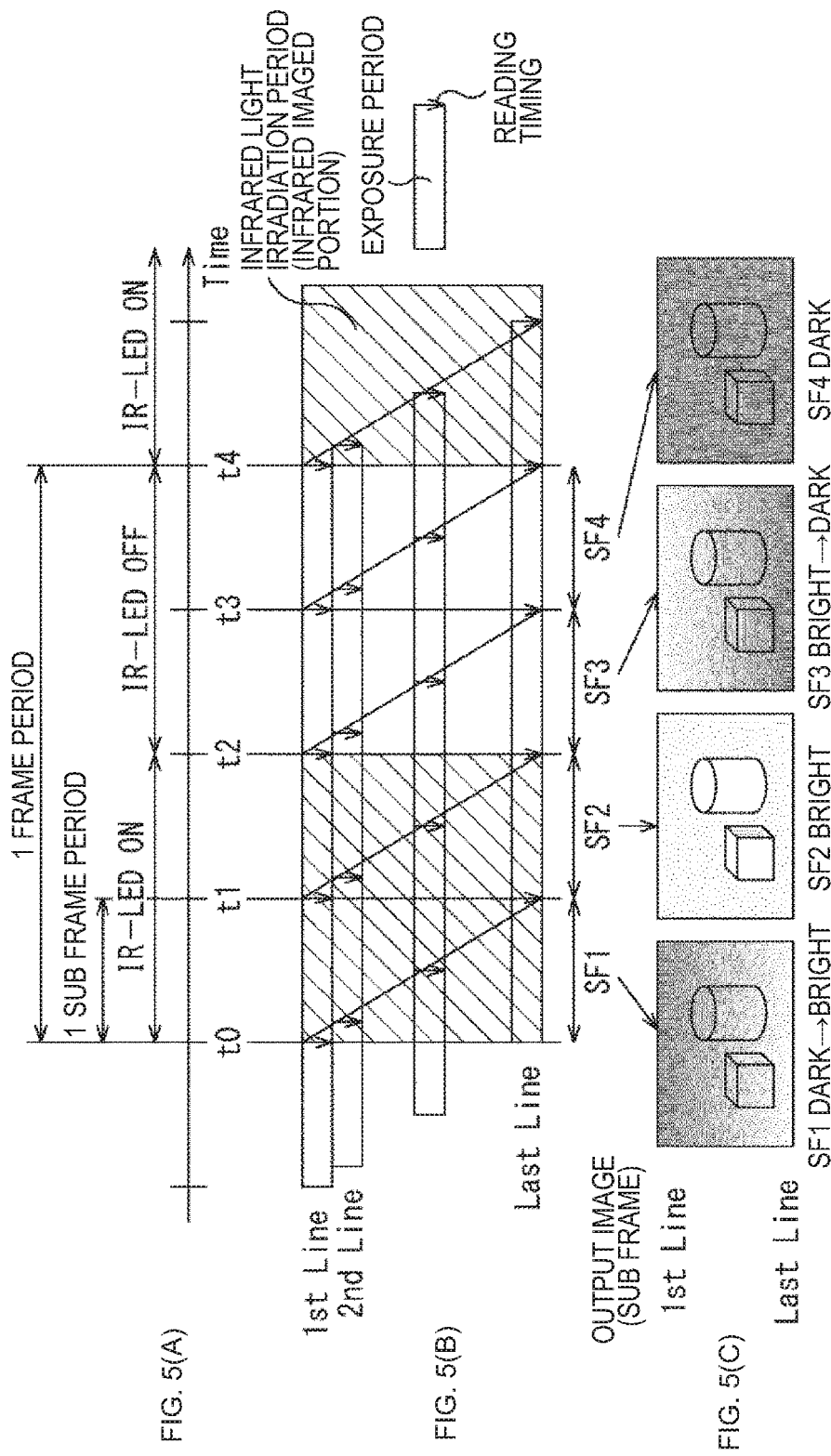
FIGS. 5(A), (B), and (C) are diagrams illustrating a first example of an imaging timing.

Next, FIGS. 5(A), (B), and (C) illustrate a first example of an imaging timing of the CMOS 13.

In the CMOS 13, one frame period (1/30 of a second in the case of 30 fps) of a frame rate (for example, 30 fps) of a color image to be finally output is divided into four, a sub frame period (1/120 of a second in the case of 30 fps) is set as one screen sweep period of the CMOS 13, and four sub frame images are able to be output from the CMOS 13 in one frame period.

When the four sub frames are imaged in one frame period, the irradiation with the infrared light is turned on in two consecutive sub frame periods, and the irradiation with the infrared light is turned off in the other two sub frame period. In the example of FIGS. 5(A), (B), and (C), the irradiation with the infrared light is turned on in the first and second sub frame periods (t0 to t2) in one frame period, but the irradiation with the infrared light may be turned on, for example, in the second and third sub frame periods (t1 to t3) or third and fourth sub frame periods (t2 to t4).

Hereinafter, the sub frame image obtained when the first sub frame period ends is referred to as a "sub frame image SF1." Similarly, sub frame images obtained when the second, third, and fourth sub frame periods end are referred to as "sub frame images SF2, SF3, and SF4," respectively.

In the first example of FIGS. 5(A), (B), and (C), the sub frame image SF1 is an image in which lines near the beginning (1st-Line) of the sweep are dark since an irradiation ON time of the infrared light occupying the exposure period is short, and brightness increases gradually as the sweep progresses since the irradiation ON time of the infrared light increases.

The sub frame image SF2 is an image in which the entire screen has uniform brightness because the irradiation with the infrared light is turned on over the entire exposure period in all the lines. Further, since the exposure time is short, motion blur of a moving subject is suppressed. Furthermore, in the CMOS sensor of the focal plane reading system, deviation of a moving subject moving at a high speed in a vertical direction (because the exposure period is shifted in units of lines) is problematic, but in the sub frame image SF2 (infrared image), since the irradiation period of the infrared light is the same in all the lines, there is an advantage in that no deviation occurs in the vertical direction.

The sub frame image SF3 is an image in which changes in brightness are opposite to those of the sub frame image SF1, and darkness increases gradually as the sweep progresses since the irradiation ON time of the infrared light is decreased. The sub frame image SF4 is an image in which the entire screen based on only the visible light is dark because the irradiation with the infrared light is turned off over the entire exposure period in all the lines. Hereinafter, the sub frame image SF2 is also referred to as an "infrared image," and the sub frame image SF4 is referred to as a "visible image."

In the camera DSP unit 14 to which the four sub frame images SF1 to SF4 are input at intervals of one frame period, the color image is generated using the sub frame image SF2 (infrared image) and the sub frame image SF4 (visible image) in which there is no brightness gradient.

<First Configuration Example of Camera DSP Unit 14>

Next, FIGS. 6A and B illustrate a first configuration example of the camera DSP unit 14 corresponding to the first example of the imaging timing illustrated in FIGS. 5(A), (B), and (C). The camera DSP unit 14 includes a timing control unit 31, an AE control unit 32, an infrared image processing system, a visible image processing system, and a color image generation system.

The timing control unit 31 generates the V synchronization signal for controlling the driving of the CMOS 13 and the ON/OFF signal for controlling the IR driving unit 17. The timing control unit 31 supplies the V synchronization signal to a signal correcting unit 41 and supplies the ON/OFF signal to the IR driving unit 17.

The AE control unit 32 performs the AE control of the imaging device 10. For example, the AE control unit 32 generates a gain adjustment signal for controlling the analog gain amplifier 23 in the CMOS 13 and an intensity signal for controlling the IR driving unit 17. The AE control unit 32 supplies the gain adjustment signal to the analog gain amplifier 23 and the signal correcting unit 41 of the CMOS 13 and supplies the intensity signal to the IR driving unit 17.

The infrared image processing system of the camera DSP unit 14 uses the infrared image (the sub frame image SF2) among the four sub frame images input from the CMOS 13 at intervals of one frame period as a processing target, and includes a 3DNR unit 33, a demosaic unit 34, and a 2DNR unit 35.

The 3DNR unit 33 performs a 3DNR process in which a 2DNR process of two-dimensionally removing noise by a filtering process of pixels of the infrared image (the sub frame image SF2) input from the CMOS 13 and neighbor pixels is combined with a time direction process of performing weighted-averaging of the infrared image input from the CMOS 13 and a previous infrared image (of one frame period before) which has undergone the 3DNR process held in a frame memory 16. A value of a weighting for a current infrared image in the time direction process is referred to as a "feedback ratio," and the feedback ratio is here set to a value larger than a feedback ratio of a 3DNR unit 36 to be described later. For example, the feedback ratio of the 3DNR unit 36 is 1/8, and the feedback ratio of the 3DNR unit 33 is 1/2.

Generally, in the time direction process in the 3DNR process, the noise reduction effect is increased if the feedback ratio of the current image is decreased, but an afterimage occurs at a moving subject edge or the like because a component of a previous image can easily remain. In this regard, in order to prevent this, the 3DNR unit 33 performs a process of suppressing the occurrence of an afterimage by detecting a moving subject in accordance with a difference between sub frames and increasing the feedback ratio of the current image for a moving subject part in the image. Here, a notification of a detected moving subject detection result is given to the 3DNR unit 36, and a notification of an edge detection result is given to a 2DNR unit 39.

The infrared image which has undergone the 3DNR process in the 3DNR unit 33 is output to the demosaic unit 34 and overwritten and recorded in the frame memory 16.

The demosaic unit 34 extracts luminance information Yir of each pixel (hereinafter referred to as "infrared luminance information Yir") from the infrared image (RAW data) which has undergone the 3DNR process and outputs the infrared luminance information Yir to the 2DNR unit 35 and the signal correcting unit 41. Specifically, a pixel value of the RAW data is used as the infrared luminance information Yir without change, or a value obtained by adding pixel values of R, and B of neighboring pixels is used as the infrared luminance information Yir.

The 2DNR unit 35 extracts a low frequency component by performing a two-dimensional noise reduction process on the infrared luminance information Yir, and outputs resulting luminance information (hereinafter referred to as "low-frequency infrared luminance information Yir_NR") to the signal correcting unit 41.

The visible image processing system of the camera DSP unit 14 uses the visible image (the sub frame image SF4) among the four sub frame images input from the CMOS 13 at intervals of one frame period as the processing target, and includes the 3DNR unit 36, a demosaic unit 37, a white balance (WB) unit 38, the 2DNR unit 39, and a YCC converting unit 40.

The 3DNR unit 36 performs a 3DNR process in which a 2DNR process of two-dimensionally removing noise by a filtering process of pixels of the visible image (the sub frame image SF4) input from the CMOS 13 and neighbor pixels is combined with a time direction process of performing weighted-averaging of the visible image input from the CMOS 13 and a previous infrared image (of one frame period before) which has undergone the 3DNR process held in the frame memory 15. Here, since the visible image input to the 3DNR unit 36 is a low-illuminance image with much noise, even if a moving subject is detected from the visible image for the time direction process, motion and noise are unable to be distinguished, and a moving subject is unable to be appropriately detected. In this regard, the 3DNR unit 36 performs the time direction process using a moving subject detection result which is detected from the infrared image and supplied from the 3DNR unit 33. Further, the feedback ratio of the 3DNR unit 36 is set to a value (1/8) smaller than the feedback ratio (for example, 1/2) of the 3DNR unit 33. Accordingly, the 3DNR unit 36 is able to sufficiently remove noise while suppressing the moving subject afterimage.

The demosaic unit 37 converts the image signal (RAW data) which has undergone the 3DNR process into RGB data in which each pixel has R, G, or B color information, and outputs the RGB data to the WB unit 38. The WB unit 38 performs a white balance process on the image signal (RGB data) and outputs a resulting signal to the 2DNR unit 39.

For example, the 2DNR unit 39 performs a two-dimensional noise reduction process (2DNR process) using a wide range filter such as an ε filter, and outputs resulting data to the YCC converting unit 40. In a case in which the 2DNR process is performed, if the wide range filter is applied to only the inside of the edge, it is possible to prevent different color information outside the edge from being retracted. However, since the visible image supplied to the 2DNR unit 39 is a low-illuminance image having much noise, the edges is unable to be appropriately detected. In this regard, the 2DNR unit 39 performs the 2DNR process using an edge detection result which is detected from the infrared image and supplied from the 3DNR unit 33. Accordingly, the 2DNR unit 39 is able to perform the two-dimensional noise reduction process using the wide range filter without mixing colors around the edge and extract a low frequency component.

The YCC converting unit 40 converts the visible image (RGB data) which has undergone the 2DNR process into a visible image (YCC data) in which each pixel has the luminance information Y and chrominance information Cb or Cr, and outputs the luminance information Y (hereinafter referred to as "visible luminance information Yc_NR") and the chrominance information Cb and Cr (hereinafter referred to as "chrominance information Cb_NR and Cr_NR") to the signal correcting unit 41.

The color image generation system of the camera DSP unit 14 uses the outputs of the infrared image processing system and the visible image processing system as a processing target, and includes a signal correcting unit 41, a γ correcting unit 42, and an RGB converting unit 43.

The signal correcting unit 41 corrects the infrared luminance information Yir input from the infrared image processing system and the chrominance information Cb_NR and Cr_NR of the visible image input from the visible image processing system. Specifically, the signal correcting unit 41 corrects the infrared luminance information Yir and the chrominance information Cb_NR and Cr_NR on the basis of the low-frequency infrared luminance information Yir_NR, the visible luminance information Yc_NR, and a gain VPGA of the analog gain amplifier 23 of the CMOS 13 adjusted by the gain adjustment signal supplied from the AE control unit 32.

In other words, as described above, in a case in which the infrared luminance information Yir is used as the luminance signal of the color image without change, the color reproduction may degrade, for example, black clothing having high infrared reflectance may become whitish clothing. The signal correcting unit 41 corrects the infrared luminance information Yir in order to prevent such a problem from occurring. Further, the signal correcting unit 41 corrects the chrominance information Cb_NR and Cr_NR in order to improve the color reproduction of the high frequency region.

Figure 7:
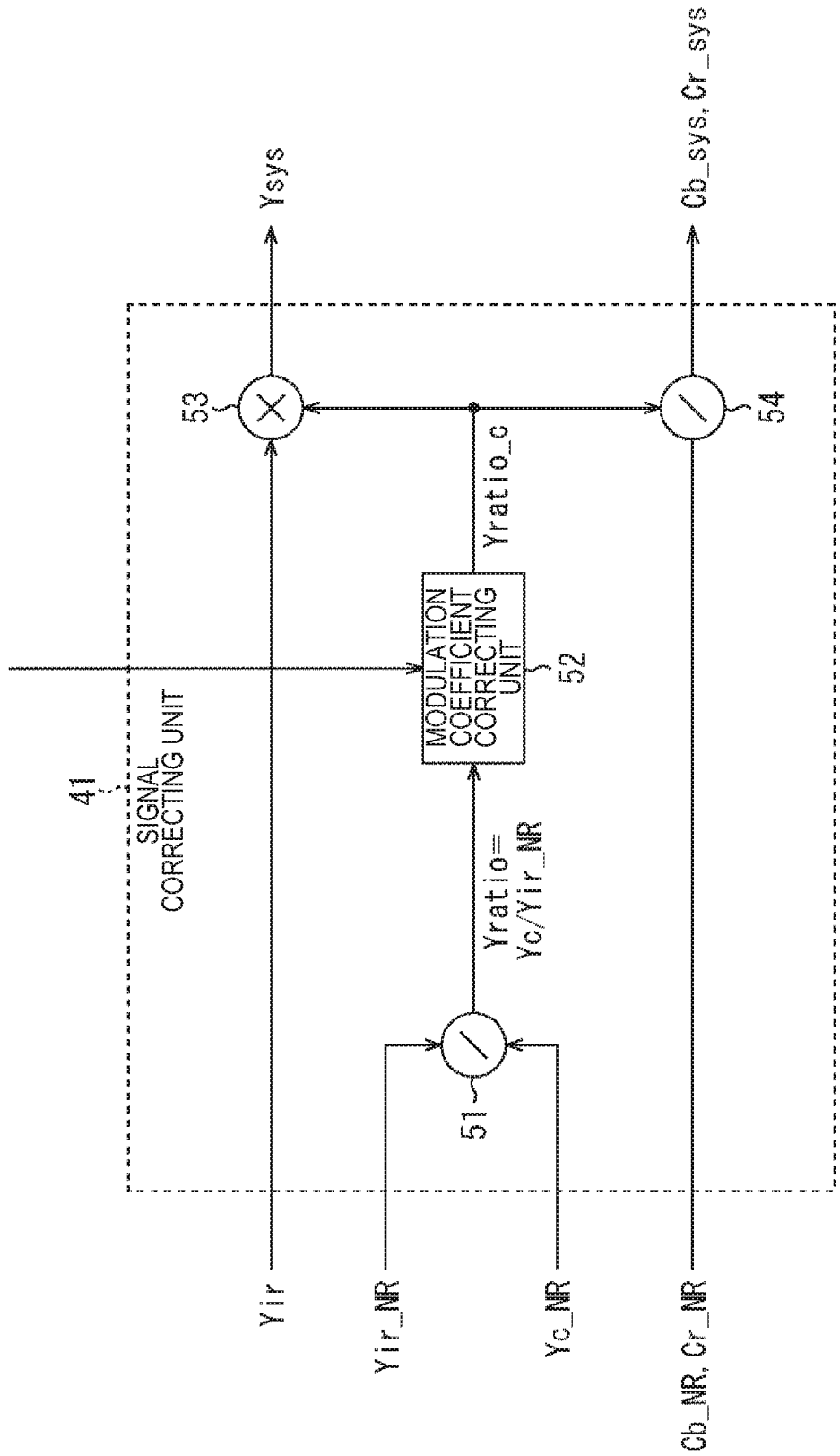
FIG. 7 is a block diagram illustrating a configuration example of a signal correcting unit.

FIG. 7 illustrates a detailed configuration example of the signal correcting unit 41. The signal correcting unit 41 is configured with a modulation coefficient setting unit 51, a modulation coefficient correcting unit 52, a luminance correcting unit 53, and a chrominance correcting unit 54.

The modulation coefficient setting unit 51 is configured with, for example, a divider. The modulation coefficient setting unit 51 calculates a modulation coefficient Yratio (=Yc_NR/Yir_NR) on the basis of a ratio between the visible luminance information Yc_NR and the low-frequency infrared luminance information Yir_NR, and outputs the obtained modulation coefficient Yratio to the modulation coefficient correcting unit 52.

The modulation coefficient correcting unit 52 corrects the modulation coefficient Yratio to a modulation coefficient Yratio_c on the basis of the gain VPGA of the analog gain amplifier 23 of the CMOS 13 adjusted by the AE control unit 32 and outputs the modulation coefficient Yratio_c to the luminance correcting unit 53 and the chrominance correcting unit 54.

The luminance correcting unit 53 is configured with, for example, a multiplier. The luminance correcting unit 53 corrects the infrared luminance information Yir to luminance information Ysys by multiplying the infrared luminance information Yir by the modulation coefficient Yratio_c in accordance with the following Formula (1), and outputs the luminance information Ysys to the γ correcting unit 42 at a subsequent stage.

$$Ysys = Yratio\_c \times Yir \quad (1)$$

The chrominance correcting unit 54 is configured with, for example, a divider. The chrominance correcting unit 54 corrects the chrominance information Cb_NR and Cr_NR to chrominance information Cb_sys and Cr_sys in accordance with the following Formulas (2) and (3), and outputs the chrominance information Cb_sys and Cr_sys to the γ correcting unit 42 at a subsequent stage.

$$Cb\_sys = Cb\_NR/Yratio\_c \quad (2)$$

$$Cr\_sys = Cr\_NR/Yratio\_c \quad (3)$$

Here, a method of correcting the modulation coefficient Yratio will be described with reference to FIGS. 8 to 14. For example, the correction of the modulation coefficient Yratio is performed in units of pixels. Hereinafter, a pixel serving as a correction target of the modulation coefficient Yratio is referred to as a "correction target pixel."

Figure 8:
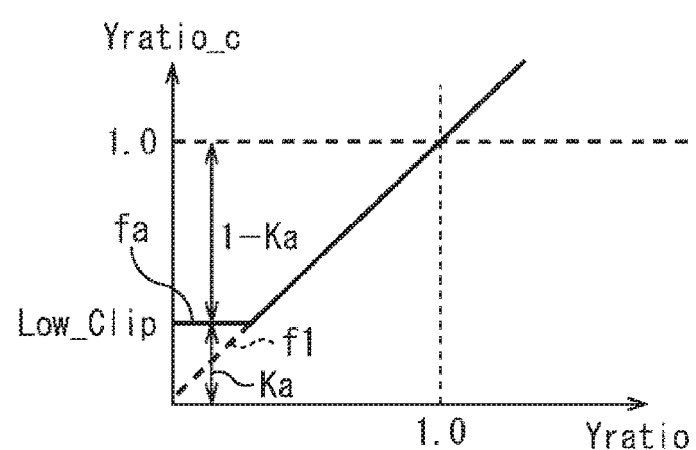
FIG. 8 is a diagram illustrating a first example of a correction function used for correction of a modulation coefficient.

First, a first correction method of correcting the modulation coefficient Yratio will be described with reference to FIG. 8. FIG. 8 is a graph illustrating a relation between the modulation coefficient Yratio and the modulation coefficient Yratio_c, and a horizontal axis indicates the modulation coefficient Yratio, whereas a vertical axis indicates the modulation coefficient Yratio_c.

In the first correction method, in a case in which the subject of the visible image or the photographing environment is dark, a Low clip process of limiting a lower limit value of the modulation coefficient Yratio_c to a clip level Low_Clip so that the modulation coefficient Yratio_c does not become too small is performed.

Brightness of the subject of the visible image or whether the photographing environment is bright or dark, that is, brightness of the subject or whether the photographing environment is bright or dark in a case in which the infrared light is not radiated is determined on the basis of the gain VPGA of the analog gain amplifier 23 of the CMOS 13 adjusted by the AE control unit 32. In accordance with the AE control performed by the AE control unit 32, the gain VPGA is decreased in a case in which the subject or the photographing environment is bright and increased in a case in which the subject or the photographing environment is dark. Therefore, the gain VPGA can be regarded as a parameter indicating the brightness of the subject of the visible image or the brightness of the photographing environment.

In a case in which the gain VPGA of the correction target pixel is equal to or less than a predetermined threshold value VGTHa, the modulation coefficient correcting unit 52 sets the modulation coefficient Yratio_c using a correction function f1 indicated by a dotted straight line in FIG. 8. Since the correction function f1 is a linear function in which Yratio_c=Yratio is held, the modulation coefficient Yratio is set to the modulation coefficient Yratio_c without being corrected. Therefore, in this case, the luminance information Ysys is corrected using the modulation coefficient Yratio without change as indicated in the following Formula (4).

$$Ysys = Yratio\_c \times Yir = Yratio \times Yir = Ym \quad (4)$$

Ym indicates luminance information obtained by modulating the infrared luminance information Yir in accordance with the visible luminance information Yc_NR (hereinafter referred to as "modulated luminance information"). Therefore, in this case, the modulated luminance information Ym is 100% used for the luminance information Ysys of the correction target pixel.

On the other hand, in a case in which the gain VPGA of the correction target pixel exceeds the threshold value VGTHa, the modulation coefficient correcting unit 52 determines that the brightness of the subject of the visible image or the brightness of the photographing environment is less than a predetermined threshold value in the correction target pixel, and performs the Low clip process without using the correction function f1.

Specifically, the modulation coefficient correcting unit 52 sets the clip level Low_Clip to an upper limit value of 1.0 in a case in which the gain VPGA of the correction target pixel is equal to or greater than a predetermined upper limit value VGMAXa (here, VGMAXa>VGTHa). Hereinafter, the upper limit value of the clip level Low_Clip is referred to as "Low_Clip_max."

On the other hand, in a case in which VGTHa<VPGA<VGMAXa, the modulation coefficient correcting unit 52 calculates a clip coefficient Ka in accordance with the following Formula (5).

$$Ka = (VPGA - VGTHa)/(VGMAXa - VGTHa) \quad (5)$$

The clip coefficient Ka indicates a ratio of a difference between the gain VPGA and the threshold value VGTHa to a difference between the upper limit value VGMAXa and the threshold value VGTHa, and has a value larger than 0 and smaller than 1 since VGTHa<VPGA<VGMAXa. Further, the clip coefficient Ka gets closer to 0 as the gain VPGA gets closer to the threshold value VGTHa and gets closer to 1 as the gain VPGA gets closer to the upper limit value VGMAXa.

Then, the modulation coefficient correcting unit 52 calculates the clip level Low_Clip in accordance with the following Formula (6).

$$Low\_Clip = Ka \times Low\_Clip\_max + (1-Ka) \times Low\_Clip\_min \quad (6)$$

Low_Clip_min indicates a lower limit value of Low_Clip and is set to, for example, 0.0. Then, in a case in which Low_Clip_min=0.0, since Low_Clip_max=1.0, Formula (6) is changed to the following Formula (7).

$$Low\_Clip = Ka \quad (7)$$

Then, the modulation coefficient correcting unit 52 sets the modulation coefficient Yratio_c of the correction target pixel to the clip level Low_Clip. Therefore, the modulation coefficient Yratio_c is set within a range from Low_Clip_min (for example, 0.0) to 1.0. Further, as the gain VPGA of the correction target pixel increases, the modulation coefficient Yratio_c is clipped to a larger value.

As described above, the modulation coefficient Yratio is converted into the modulation coefficient Yratio_c in accordance with a correction function fa indicated by a solid line in FIG. 8.

Here, in a case in which the subject or the photographing environment is dark, since little luminance information is included in the visible image, the visible luminance information Yc_NR contains a lot of noise components. Therefore, if the modulated luminance information Ym obtained by modulating the infrared luminance information Yir in accordance with the visible luminance information Yc_NR is used for the luminance information Ysys without change, the luminance noise increases.

On the other hand, through the Low clip process described above, the modulation coefficient Yratio_c is clipped to the clip level Low_Clip corresponding to the gain VPGA so that the modulation coefficient Yratio_c does not become too small. Accordingly, the luminance information Ysys is set to a constant multiple of the infrared luminance information Yir (modulation coefficient Yratio_c times), and thus the occurrence of the luminance noise can be suppressed.

In a case in which the gain VPGA>VGMAXa, since the modulation coefficient Yratio is set to 1.0, the infrared luminance information Yir is 100% used for the luminance information Ysys of the correction target pixel as indicated in the following Formula (8).

$$Ysys=Yratio\_c*Yir=Yir \quad (8)$$

Figure 9:
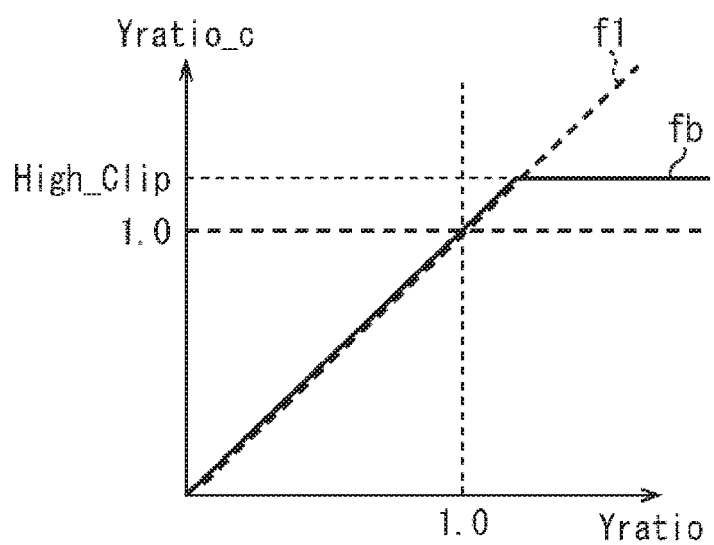
FIG. 9 is a diagram illustrating a second example of a correction function used for correction of a modulation coefficient.
Figure 10:
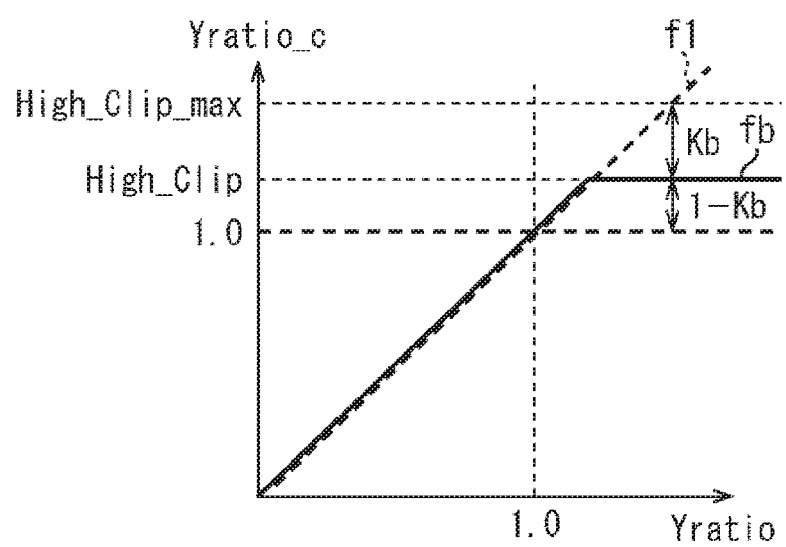
FIG. 10 is a diagram illustrating a second example of a correction function used for correction of a modulation coefficient.

Next, a second correction method of correcting the modulation coefficient Yratio will be described with reference to FIGS. 9 and 10. FIG. 9 and FIG. 10 are graphs illustrating a relation between the modulation coefficient Yratio and the modulation coefficient Yratio_c, similarly to FIG. 8.

In this second correction method, in a case in which the subject of the visible image or the photographing environment is bright, a High clip process of limiting an upper limit value of the modulation coefficient Yratio_c to a clip level High_Clip so that the modulation coefficient Yratio_c does not become too large is performed as illustrated in FIG. 9.

In a case in which the modulation coefficient Yratio in the correction target pixel is 1.0 or less, the modulation coefficient correcting unit 52 sets the modulation coefficient Yratio_c using a correction function f1. In other words, in a case in which the visible luminance information Yc_NR≤the low-frequency infrared luminance information Yir_NR in the correction target pixel, that is, in a case in which the brightness of the visible image is less than or equal to the brightness of the infrared image in the correction target pixel, the modulation coefficient Yratio is set to modulation coefficient Yratio_c without being corrected.

On the other hand, in a case in which the modulation coefficient Yratio exceeds 1.0 in the correction target pixel, that is, in a case in which the visible image is brighter than the infrared image in the correction target pixel, the High clip process is performed without using the correction function f1.

Specifically, the modulation coefficient correcting unit 52 sets the clip level High_Clip to the upper limit value High_Clip_max in a case in which the gain VPGA of the correction target pixel is equal to or less than a predetermined threshold value VGTHb. The upper limit value High_Clip_max is set to a value greater than 1.0.

Further, the modulation coefficient correcting unit 52 sets the clip level High_Clip to a lower limit value High_Clip_min in a case in which the gain VPGA is equal to or higher than a predetermined upper limit value VGMAXb. The lower limit value High_Clip_min is set to, for example, 1.0.

Further, in a case in which VGTHb<VPGA<VGMAXb, the modulation coefficient correcting unit 52 first calculates a clip coefficient Kb in accordance with the following Formula (9).

$$Kb=(VPGA-VGTHb)/(VGMAXb-VGTHb) \quad (9)$$

The clip coefficient Kb indicates a ratio of a difference between the gain VPGA and the threshold value VGTHb to a difference between the upper limit value VGMAXb and the threshold value VGTHb and is a value greater than 0 and less than 1 because VGTHb<VPGA<VGMAXb. Further, the clip coefficient Kb gets closer to 0 as the gain VPGA gets closer to the threshold value VGTHb and gets closer to 1 as the gain VPGA gets closer to the upper limit value VGMAXb.

Then, the modulation coefficient correcting unit 52 calculates the clip level High_Clip in accordance with the following Formula (10).

$$High\_Clip=Kb\times High\_Clip\_min+(1-Kb)\times High\_Clip\_max \quad (10)$$

In a case in which the lower limit value High_Clip_min is 1.0, Formula (10) is changed to the following Formula (11).

$$High\_Clip=Kb+(1-Kb)\times High\_Clip\_max \quad (11)$$

Then, the modulation coefficient correcting unit 52 sets the modulation coefficient Yratio_c to the clip level High_Clip.

Therefore, the modulation coefficient Yratio_c is set within a range from High_Clip_min (for example, 1.0) to High_Clip_max. As the gain VPGA of the correction target pixel gets closer to the threshold value VGTHb, it gets closer to the upper limit value High_Clip_max, and as the gain VPGA of the correction target pixel gets closer to the upper limit value VGMAXb, it gets closer to High_Clip_min (for example, 1.0). In other words, as the gain VPGA of the correction target pixel increases, the modulation coefficient Yratio_c is clipped to a smaller value.

As described above, the modulation coefficient Yratio is converted into the modulation coefficient Yratio_c using the correction function fb indicated by a solid line in FIG. 10.

Here, for example, in a case in which the visible image has a very bright region, if the luminance modulation is excessively applied in accordance with the visible luminance information Yc_NR, blown-out highlights occur in the region.

Further, if both the low-frequency infrared luminance information Yir_NR and the visible luminance information Yc_NR are small, the modulation coefficient Yratio may exceed 1.0 although the subject and the photographing environment are dark. In this case, in a case in which the luminance modulation is excessively applied in accordance with the visible luminance information Yc_NR, the luminance noise increases.

On the other hand, through the High clip process described above, the modulation coefficient Yratio_c is clipped to the clip level High_Clip corresponding to the gain VPGA so that the modulation coefficient Yratio_c does not become too large. Accordingly, the luminance information Ysys is set to a constant multiple of the infrared luminance information Yir (modulation coefficient Yratio_c times), and thus the occurrence of the brown-out highlights and the luminance noise can be suppressed.

Figure 11:
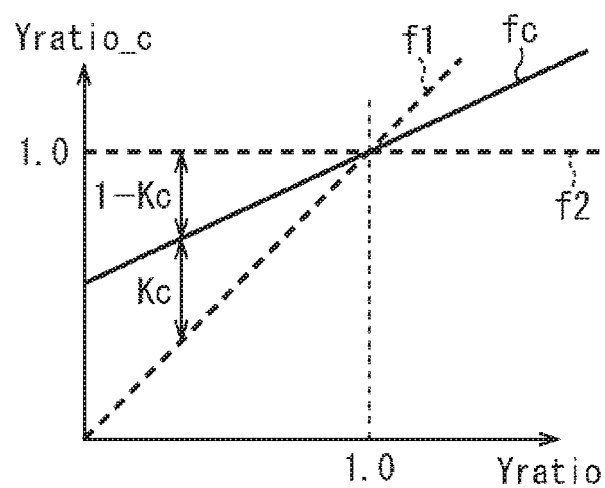
FIG. 11 is a diagram illustrating a third example of a correction function used for correction of a modulation coefficient.

Next, a third correction method of correcting the modulation coefficient Yratio will be described with reference to FIG. 11. FIG. 11 is a graph illustrating a relation between the modulation coefficient Yratio and the modulation coefficient Yratio_c, similarly to FIGS. 8 to 10.

In this third correction method, in a case in which the subject of the visible image or the photographing environment is dark, a process of synthesizing the modulated luminance information Ym with the infrared luminance information Yir in accordance with the brightness of the visible image is performed.

Specifically, the modulation coefficient correcting unit 52 sets the modulation coefficient Yratio_c in accordance with the correction function f1 in a case in which the gain VPGA of the correction target pixel is equal to or less than a predetermined threshold value VGTHc. In other words, the modulation coefficient Yratio is set to the modulation coefficient Yratio_c without being corrected.

On the other hand, in a case in which the gain VPGA of the correction target pixel exceeds the threshold value VGTHc, the modulation coefficient correcting unit 52 determines that the brightness of the subject of the visible image or the brightness of the photographing environment is less than a predetermined threshold value in the correction target pixel, and performs a process of synthesizing the modulated luminance information Ym with the infrared luminance information Yir.

Specifically, the modulation coefficient correcting unit 52 sets a blend rate Kc to an upper limit value of 1.0 in a case in which the gain VPGA is equal to or greater than the upper limit value VGMAXc (here, VGMAXc>VGTHc).

On the other hand, in a case in which VGTHc<VPGA<VGMAXc, the modulation coefficient correcting unit 52 calculates the blend rate Kc in accordance with the following Formula (12).

$$Kc=(VPGA-VGTHc)/(VGMAXc-VGTHc) \qquad (12)$$

The blend rate Kc indicates a ratio of a difference between the gain VPGA and the threshold value VGTHc to a difference between the upper limit value VGMAXc and the threshold value VGTHc, and is a value greater than 0 and less than 1 because VGTHc<VPGA<VGMAXc. Further, the blend rate Kc gets closer to 0 as the gain VPGA gets closer to the threshold value VGTHc and gets closer to 1 as the gain VPGA gets closer to the upper limit value VGMAXc.

Then, the modulation coefficient correcting unit 52 calculates the modulation coefficient Yratio_c in accordance with the following Formula (13).

$$Yratio\_c=Kc\times1.0+(1-Kc)\times Yratio \qquad (13)$$

As described above, the modulation coefficient Yratio is corrected to the modulation coefficient Yratio_c in accordance with a correction function fc indicated by a solid line in FIG. 11. When the modulation coefficient Yratio_c is applied to Formula (1) described above, the modulated luminance information Ym and the infrared luminance information Yir are synthesized in accordance with the blend rate Kc corresponding to the gain VPGA.

The correction function fc is a function obtained by synthesizing the correction function f1 with a correction function f2 in accordance with the blend rate Kc. Since the correction function f2 is a function in which Yratio_c=1.0, the modulation coefficient Yratio_c has a value obtained by synthesizing the modulation coefficient Yratio with the modulation coefficient (=1.0) in a case in which the infrared luminance information Yir is not corrected in accordance with the blend rate Kc.

Here, as described above, in a case in which the subject or the photographing environment is dark, if the modulated luminance information Ym is used for the luminance information Ysys without change, the luminance noise increases.

On the other hand, when the modulated luminance information Ym and the infrared luminance information Yir are synthesized in accordance with the blend rate Kc corresponding to the gain VPGA, the occurrence of the luminance noise can be suppressed.

Figure 12:
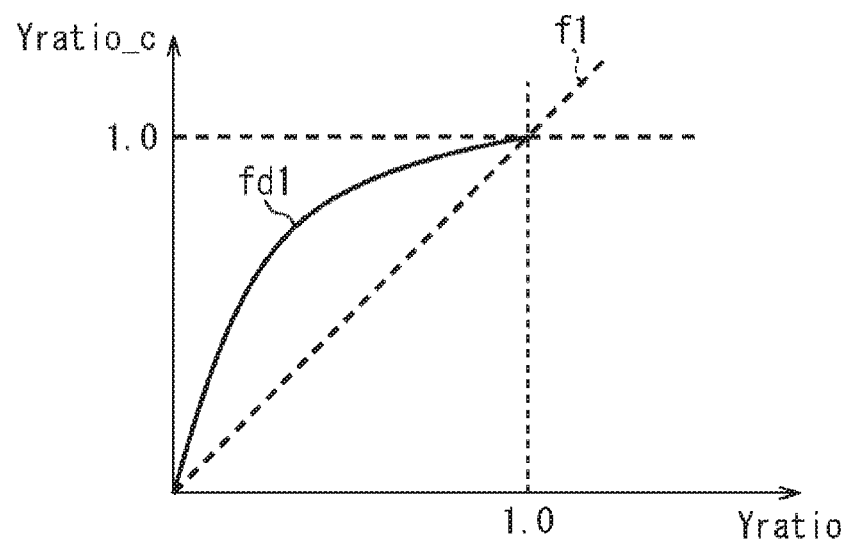
FIG. 12 is a diagram illustrating a fourth example of a correction function used for correction of a modulation coefficient.
Figure 13:
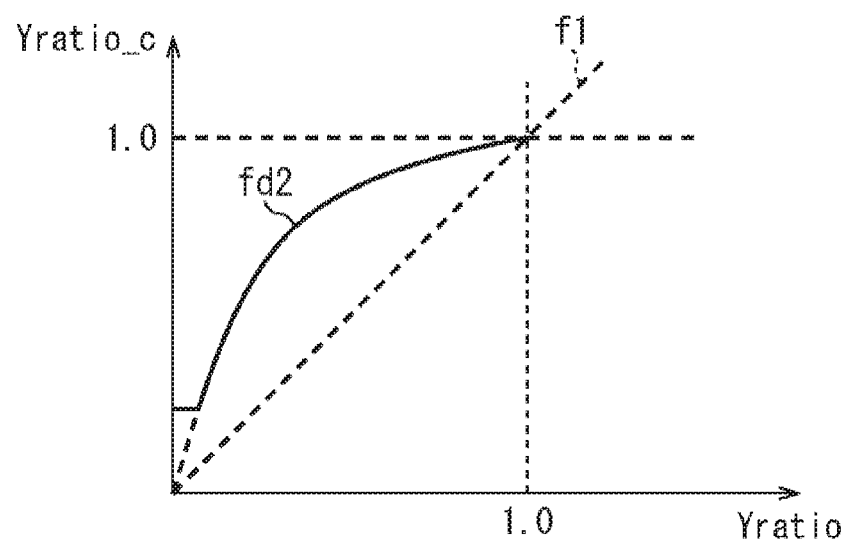
FIG. 13 is a diagram illustrating a fifth example of a correction function used for correction of a modulation coefficient.

Next, a fourth correction method of correcting the modulation coefficient Yratio will be described with reference to FIG. 12. FIG. 12 is a graph illustrating a relation between modulation coefficient Yratio and modulation coefficient Yratio_c, similarly to FIGS. 8 to 11.

In the fourth correction method, in a case in which the subject of the visible image or the photographing environment is dark, the modulation coefficient Yratio is converted into the modulation coefficient Yratio_c using a non-linear correction function.

Specifically, the modulation coefficient correcting unit 52 sets the modulation coefficient Yratio_c using the correction function f1 in a case in which the gain VPGA of the correction target pixel is equal to or less than a predetermined threshold value VGTHd. In other words, the modulation coefficient Yratio is set to the modulation coefficient Yratio_c without being corrected.

On the other hand, in a case in which the gain VPGA of the correction target pixel exceeds the threshold value VGTHd, the modulation coefficient correcting unit 52 determines that the brightness of the subject of the visible image or the photographing environment is less than a predetermined threshold value in the correction target pixel, and converts the modulation coefficient Yratio into the modulation coefficient Yratio_c using a non-linear correction function fd1. FIG. 12 illustrates an example of the correction function fd1, for example, a power function of the following Formula (14).

$$Yratio\_c=(Yratio)^{1/\alpha} \text{ (here, } \alpha>1\text{)} \qquad (14)$$

The correction function fd1 of Formula (14) is similar to a gamma curve. Further, it is possible to adjust a degree of modulation by selecting the exponent a of the correction function fd1. For example, if a value of the exponent a is increased, the modulation coefficient Yratio_c gets closer to 1 as a whole, and the degree of modulation is decreased. Conversely, if the value of the exponent a is decreased, the modulation coefficient Yratio_c deviates from 1, and the degree of modulation is increased. Accordingly, it is possible to synthesize the modulated luminance information Ym with the infrared luminance information Yir while maintaining a luminance contrast of the visible image as compared with the third correction method.

However, in the correction function fd1, an inclination is steep in a region in which the value of the modulation coefficient Yratio is small, the modulation coefficient Yratio_c greatly varies due to a slight difference in the modulation coefficient Yratio, and it may be a cause of amplifying the noise. In this regard, in order to prevent such a problem, the modulation coefficient Yratio_c may be clipped in a region in which the modulation coefficient Yratio is small as in the correction function fd 2 illustrated in FIG. 13. As a clipping method, the first correction method described above may be used.

Figure 14:
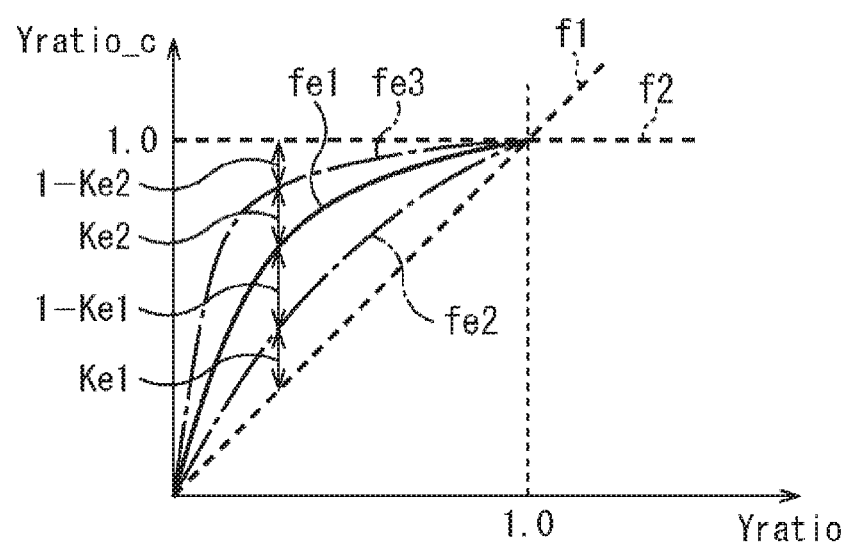
FIG. 14 is a diagram illustrating a sixth example of a correction function used for correction of a modulation coefficient.

Next, a fifth correction method of modulation coefficient Yratio will be described with reference to FIG. 14. FIG. 14 is a graph illustrating a relation between the modulation coefficient Yratio and the modulation coefficient Yratio_c, similarly to FIGS. 8 to 13.

In the fifth correction method, a plurality of correction functions are differently used on the basis of the gain VPGA. In other words, a combination of correction functions to be used is selected from a plurality of correction functions on the basis of the gain VPGA, and the modulation coefficient Yratio is corrected using the selected correction functions.

Specifically, the modulation coefficient correcting unit 52 sets the modulation coefficient Yratio_c using the correction function f1 in a case in which the gain VPGA of the correction target pixel is equal to or less than a predetermined threshold value VGTHe. In other words, the modulation coefficient Yratio is set to the modulation coefficient Yratio_c without being corrected.

On the other hand, in a case in which the gain VPGA of the correction target pixel exceeds the threshold value VGTHe, the modulation coefficient correcting unit 52 determines that the brightness of the subject of the visible image or the photographing environment of the visible image is less than a predetermined threshold value in the correction target pixel, and converts the modulation coefficient Yratio into the modulation coefficient Yratio_c using a plurality of correction functions differently.

Specifically, the modulation coefficient correcting unit 52 sets the modulation coefficient Yratio_c to 1.0 in a case in which the gain VPGA of the correction target pixel is equal to or greater than a predetermined upper limit value VGMAXe (here, VGMAXe>VGTHe). In other words, in this case, the modulation coefficient Yratio_c is set in accordance with the correction function f2.

In a case in which the gain VPGA of the correction target pixel is equal to a predetermined intermediate value VGMID (here, VGTHe<VGMID<VGMAXe), the modulation coefficient correcting unit 52 corrects the modulation coefficient Yratio to the modulation coefficient Yratio_c using a reference correction function fe1. For example, the reference correction function fe1 is the same function as the correction function fd1 in FIG. 12. Further, for example, the intermediate value VGMID is set to a median value of the threshold value VGTHe and the upper limit value VGMAXe.

Further, in a case in which VGTHe<VPGA<VGMID, the modulation coefficient correcting unit 52 calculates a blend rate Ke1 in accordance with the following Formula (15).

$$Ke1=(VPGA-VGTHe)/(VGMID-VGTHe) \quad (15)$$

The blend rate Ke1 indicates a ratio of a difference between the gain VPGA and the threshold value VGTHe to a difference between the intermediate value VGMID and the threshold value VGTHe and is a value greater than 0 and less than 1 because VGTHe<VPGA<VGMID. Further, the blend rate Ke1 gets closer to 0 as the gain VPGA gets closer to the threshold value VGTHe and gets closer to 1 as the gain VPGA gets closer to the intermediate value VGMID.

Then, the modulation coefficient correcting unit 52 calculates the modulation coefficient Yratio_c in accordance with the following Formula (16) using the blend rate Ke1.

$$Yratio\_c=Ke1 \times Yratio\_n1+(1-Ke1) \times Yratio \quad (16)$$

A modulation coefficient Yratio_n1 is a modulation coefficient in a case in which the modulation coefficient Yratio is converted in accordance with the reference correction function fe1. Therefore, the modulation coefficient Yratio_c is a value obtained by synthesizing the modulation coefficient Yratio with the modulation coefficient Yratio_n1 in accordance with the blend rate Ke1. As the gain VPGA gets closer to the threshold value VGTHe and the blend rate Ke1 gets closer to 0, the modulation coefficient Yratio_c gets closer to the modulation coefficient Yratio, and as the gain VPGA gets closer to the intermediate value VGMID and the blend rate Ke1 gets closer to 1, the modulation coefficient Yratio_c gets closer to the modulation coefficient Yratio_n1.

Accordingly, as illustrated in FIG. 14, a combination of the correction function f1 and the reference correction function fe1 is selected, and the modulation coefficient Yratio is corrected to the modulation coefficient Yratio_c in accordance with a correction function fe2 obtained by synthesizing the two correction functions in accordance with the blend rate Ke1. Further, the modulation coefficient Yratio_c is applied to Formula (1), and the modulated luminance information Ym and a reference luminance information Yn1 are synthesized in accordance with the blend rate Ke1 corresponding to the gain VPGA. The reference luminance information Yn1 is luminance information obtained by correcting the infrared luminance information Yir using the modulation coefficient Yratio_n1.

Further, in a case in which VGMID<VPGA<VGMAXe, the modulation coefficient correcting unit 52 calculates a blend rate Ke2 in accordance with the following Formula (17).

$$Ke2=(VPGA-VGMID)/(VGMAXe-VGMID) \quad (17)$$

The blend rate Ke2 indicates a ratio of a difference between the gain VPGA and the intermediate value VGMID to a difference between the upper limit value VGMAXe and the intermediate value VGMID and is a value larger than 0 and smaller than 1 because VGMID<VPGA<VGMAXe. Further, the blend rate Ke2 gets closer to 0 as the gain VPGA gets closer to the intermediate value VGMID and gets closer to 1 as the gain VPGA gets closer to the upper limit value VGMAXe.

Then, the modulation coefficient correcting unit 52 calculates the modulation coefficient Yratio_c in accordance with the following Formula (18) using the blend rate Ke2.

$$Yratio\_c=Ke2 \times 1.0+(1-Ke2) \times Yratio\_n1 \quad (18)$$

As described above, the modulation coefficient Yratio_c is a value obtained by synthesizing the modulation coefficient of 1.0 with the modulation coefficient Yratio_n1 using the blend rate Ke2. As the gain VPGA gets closer to the intermediate value VGMID and the blend rate Ke2 gets closer to 0, the modulation coefficient Yratio_c gets closer to the modulation coefficient Yratio_n1, and as the gain VPGA gets closer to the upper limit value VGMAXe and the blend rate Ke2 gets closer to 1, the modulation coefficient Yratio_c gets closer to 1.0.

Accordingly, as illustrated in FIG. 14, a combination of the reference correction function fe1 and the correction function f2 is selected, and the modulation coefficient Yratio is corrected to the modulation coefficient Yratio_c in accordance with the correction function fe2 obtained by synthesizing the two correction functions in accordance with the blend rate Ke2. Further, the modulation coefficient Yratio_c is applied to Formula (1), and the reference luminance information Yn1 and the infrared luminance information Yir are synthesized in accordance with the blend rate Ke2 corresponding to the gain VPGA.

Accordingly, it is possible to synthesize the modulated luminance information Ym with the infrared luminance information Yir with a ratio more suitable for the brightness of the subject or the brightness of photographing environment than in the fourth correction method.

In the fifth correction method, it is also possible to further increase the number of reference correction functions and synthesize the modulated luminance information Ym with the infrared luminance information Yir with a ratio corresponding to the gain VPGA in further detail. Further, it is also possible to use, for example, only one of the correction function fe2 and a correction function fe3.

The first to fifth correction methods can be combined within a possible range. For example, the first correction method may be combined with the second correction method, the fourth correction method, or the fifth correction method. Further, for example, the second correction method may be combined with the fourth correction method or the fifth correction method.

Further, the conversion from the modulation coefficient Yratio to the modulation coefficient Yratio_c may be calculated using a function each time, or a conversion table which is generated in advance may be used.

The description will now return to FIG. 6. The γ correcting unit 42 performs a γ correction process on the luminance information Ysys and the chrominance information Cb_sys and Cr_sys input from the signal correcting unit 41 and outputs the luminance information Ysys and the chrominance information Cb_sys and Cr_sys which have undergone the γ correction process to the RGB converting unit 43.

The RGB converting unit 43 generates one color image in which each pixel has the R, or B color information at intervals of one frame period on the basis of the luminance information Ysys and the chrominance information Cb_sys and Cr_sys which have undergone the γ correcting process and have been output from the γ correcting unit 42, and outputs the generated color image to a subsequent stage.

<Color Image Generation Process Performed by Camera DSP Unit 14>

Figure 15:
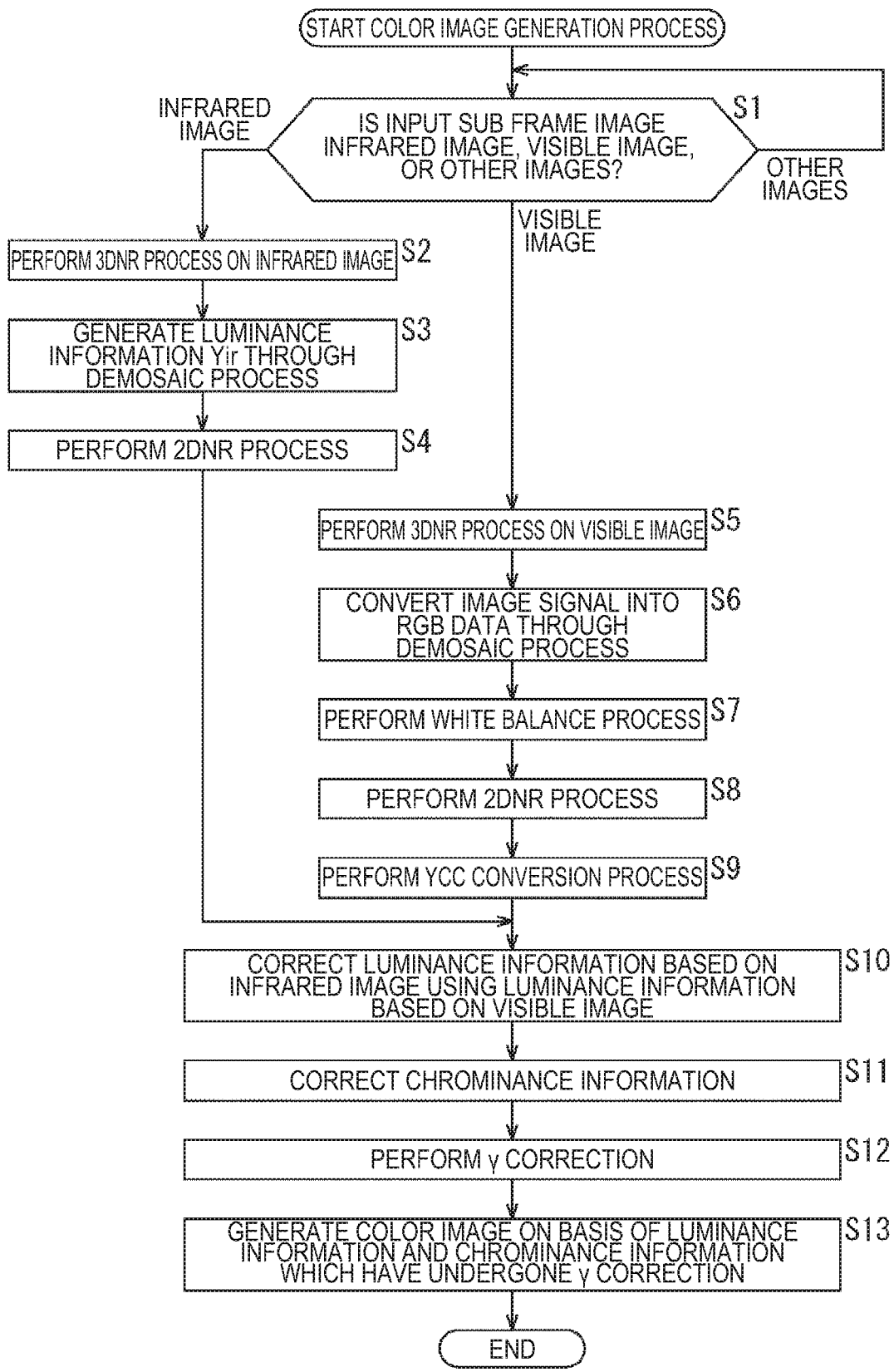
FIG. 15 is a flowchart illustrating a color image generation process.

Next, FIG. 15 is a flowchart for describing the color image generation process performed by the camera DSP unit 14.

It is assumed that the color image generation process is executed at intervals of one frame period, and the four sub frame images SF1 to SF4 are input from the CMOS 13 to the camera DSP unit 14 in one frame period.

In step S1, the four sub frame images input from the CMOS 13 in one frame period are sorted to the infrared image processing system, the visible image processing system, or other systems (discarding). Specifically, the sub frame image SF2 is sorted to the infrared image processing system, and a process of steps S2 to S4 are performed. Further, the sub frame image SF4 is sorted to the visible image processing system, and a process of steps S5 to S9 is performed. The sub frame images SF1 and SF3 are discarded.

In the infrared image processing system, in step S2, the 3DNR unit 33 performs the 3DNR process on the infrared image (the sub frame image SF2) input from the CMOS 13, outputs the infrared image which has undergone the 3DNR process to the demosaic unit 34, and overwrites and records the infrared image in the frame memory 16.

In step S3, the demosaic unit 34 extracts the infrared luminance information Yir of each pixel from the infrared image (RAW data) which has undergone the 3DNR process and outputs the infrared luminance information Yir to the 2DNR unit 35 and the signal correcting unit 41. In step S4, the 2DNR unit 35 performs the two-dimensional noise reduction process on the infrared luminance information Yir to extract the low frequency component, and outputs the low-frequency infrared luminance information Yir_NR obtained as a result to the signal correcting unit 41.

In the visible image processing system, in step S5, the 3DNR unit 36 performs the 3DNR process on the visible image (the sub frame image SF4) input from the CMOS 13, outputs the visible image which has undergone the 3DNR process to the demosaic unit 37, and overwrites and records the visible image in the frame memory 15.

In step S6, the demosaic unit 37 converts the image signal (RAW data) which has undergone the 3DNR process into RGB data and outputs the RGB data to the WB unit 38.

In step S7, the WB unit 38 performs the white balance process on the image signal (RGB data) and outputs the resulting RGB data to the 2DNR unit 39.

In step S8, the 2DNR unit 39 performs the 2DNR process on the visible image (RGB data) which has undergone the white balance process and outputs the resulting RGB data to the YCC converting unit 40.

In step S9, the YCC converting unit 40 converts the visible image (RGB data) which has undergone the 2 DNR process into the visible image (YCC data), and outputs the visible luminance information Yc_NR and the chrominance information Cb_NR and Cr_NR to the signal correcting unit 41.

In the color image generation system which obtains a processing result from each of the infrared image processing system and the visible image processing system, in step S10, the signal correcting unit 41 corrects the luminance information based on the infrared image using the luminance information based on the visible image. In other words, as described above with reference to FIGS. 7 to 14, the infrared luminance information Yir is corrected to the luminance information Ysys of the color image to be generated at a subsequent stage on the basis of the low-frequency infrared luminance information Yir_NR, the visible luminance information Yc_NR, and the gain VPGA of the analog gain amplifier 23 and output to the γ correcting unit 42.

In step S11, the signal correcting unit 41 corrects the chrominance information Cb_NR and Cr_NR to the chrominance information Cb_sys and Cr_sys of the color image to be generated at the subsequent stage on the basis of the above-described Formulas (2) and (3) and outputs the chrominance information Cb_sys and Cr_sys to the γ correcting unit 42.

In step S12, the γ correcting unit 42 performs the γ correction process for the luminance information Ysys and the chrominance information Cb_sys and Cr_sys input from the signal correcting unit 41, and outputs the luminance information Ysys and the chrominance information Cb_sys and Cr_sys which have undergone the γ correction process to the RGB converting unit 43.

In step S13, the RGB converting unit 43 generates one color image in which each pixel has the color information of R, or B at intervals of one frame period on the basis of the luminance information Ysys and the chrominance information Cb_sys and Cr_sys which have undergone the γ correction process and have been output from the γ correcting unit 42, and outputs the color image to a subsequent stage. The color image generation process has been described above.

According to the color image generation process described above, it is possible to generate the color image with the high degree of color reproduction on the basis of the infrared image and the visible image output from the CMOS 13 of the focal plane reading system.

Further, it is possible to correct the luminance information of the infrared image appropriately using luminance information of visible image in accordance with the brightness of the subject or the brightness of the photographing environment. Accordingly, it is possible to generate a color image in which the visibility by the infrared light and the color reproduction are improved when it is bright, and it is possible to generate a color image in which the visibility by the infrared light is improved by suppressing the color noise when it is dark.

<Modified Example of Color Filter>

Figure 16A:
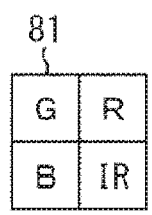
FIGS. 16A and B are diagrams illustrating a modified example of a color array of a color filter of a CMOS.

Next, a modified example of the imaging device 10 will be described. FIGS. 16A and B illustrate a modified example of the color filter 21a covering the light receiving surface of the CMOS 13. In the above description, the color filter 21a is configured with color filters of R, G, and B according to the Bayer array, but instead of the color filter 21a, an RGB-IR filter 81 configured with the color filters R, G, and B and an IR filter that transmits infrared light as illustrated in FIG. 16A. In a case in which the RGB-IR filter 81 is employed, it is desirable to use values obtained from the IR pixels as the pixel values of the infrared image and use values obtained by an IR signal subtraction process (a process of subtracting the pixel value of the IR pixel from the pixel values of the R, G, and B pixels) as the pixel values of the visible image.

Figure 16B:
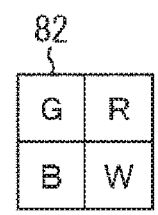

Further, an RGB-W filter 82 configured with the color filters R, G, and B and a portion in which no color file is installed to transmit the entire visible light band may be employed as illustrated in FIG. 16B. In a case in which the RGB-W filter 82 is employed, it is desirable to use values calculated from the R, G, B, and W pixels by an operation process as the pixel values of the infrared image and the visible image.

Further, when the RGB-IR filter 81 or the RGB-W filter 82 is employed, it is possible to separate the infrared light and the visible light which are not radiated from the IR irradiating unit 18 but exist in the environment, which is not implemented in the Bayer array color filter.

<Second Example of Imaging Timing of CMOS 13>

Next, FIGS. 17(A), (B), (C), and (D) illustrate a second example of the imaging timing of the CMOS 13.

In the second example of the imaging timing, four sub frame images can be output from the CMOS 13 I one frame period, similarly to the first example illustrated in FIGS. 5(A), (B), and (C). However, an irradiation timing of the infrared light is different from that in the first example.

In other words, in the second example, the irradiation of the infrared light is turned on in one common sub frame period in each frame period among the four sub frame periods in one frame period, and the irradiation of the infrared light is turned off in the other 3 sub frame periods. In an example of FIGS. 17(A), (B), (C), and (D), the irradiation of the infrared light is turned on in a 1st sub frame period (t0 to t1) in one frame period, but, for example, the irradiation of the infrared light may be turned on in another sub frame period.

In the second example of FIGS. 17(A), (B), (C), and (D), the sub frame image SF1 is an image in which lines near the beginning (1st-Line) of the sweep are dark since an irradiation ON time of the infrared light occupying in the exposure period is short, and brightness increases gradually as the sweep progresses since the irradiation ON time of the infrared light increases. The sub frame image SF2 is an image in which changes in bright and dark are opposite to those of the sub frame image SF1, and darkness increases gradually as the sweep progresses since the irradiation ON time of the infrared light is decreased. The sub frame images SF3 and SF4 are images in which the entire screen based on only the visible light is dark because the irradiation of the infrared light is turned off over the entire exposure period in all the lines.

Further, in a case in which a time of the state in which the irradiation of the infrared light is turned on in the exposure times of the sub frame image SF1 and the sub frame image SF2 is considered, luminance gradations of the sub frame image SF1 and the sub frame image SF2 can be regarded as having a complementary relation. Therefore, in a case in which both are added, it is possible to obtain an image corresponding to a state in which the infrared light is radiated over the entire period (one sub frame period) of the exposure period in all the lines. Therefore, the infrared image is generated by adding (averaging) corresponding pixels of the sub frame image SF1 and the sub frame image SF2.

Similarly, in a case in which the exposure time for the state in which the irradiations of the infrared lights of the sub frame image SF3 and the sub frame image SF4 are turned off is considered, it is possible to obtain an image corresponding to the imaging in the state of only the visible light in the exposure period corresponding to the two sub frame periods in which both are added. Therefore, the visible image is generated by adding (averaging) corresponding pixels of the sub frame image SF3 and the sub frame image SF4.

<Second Configuration Example of Camera DSP Unit 14>

Figure 18:
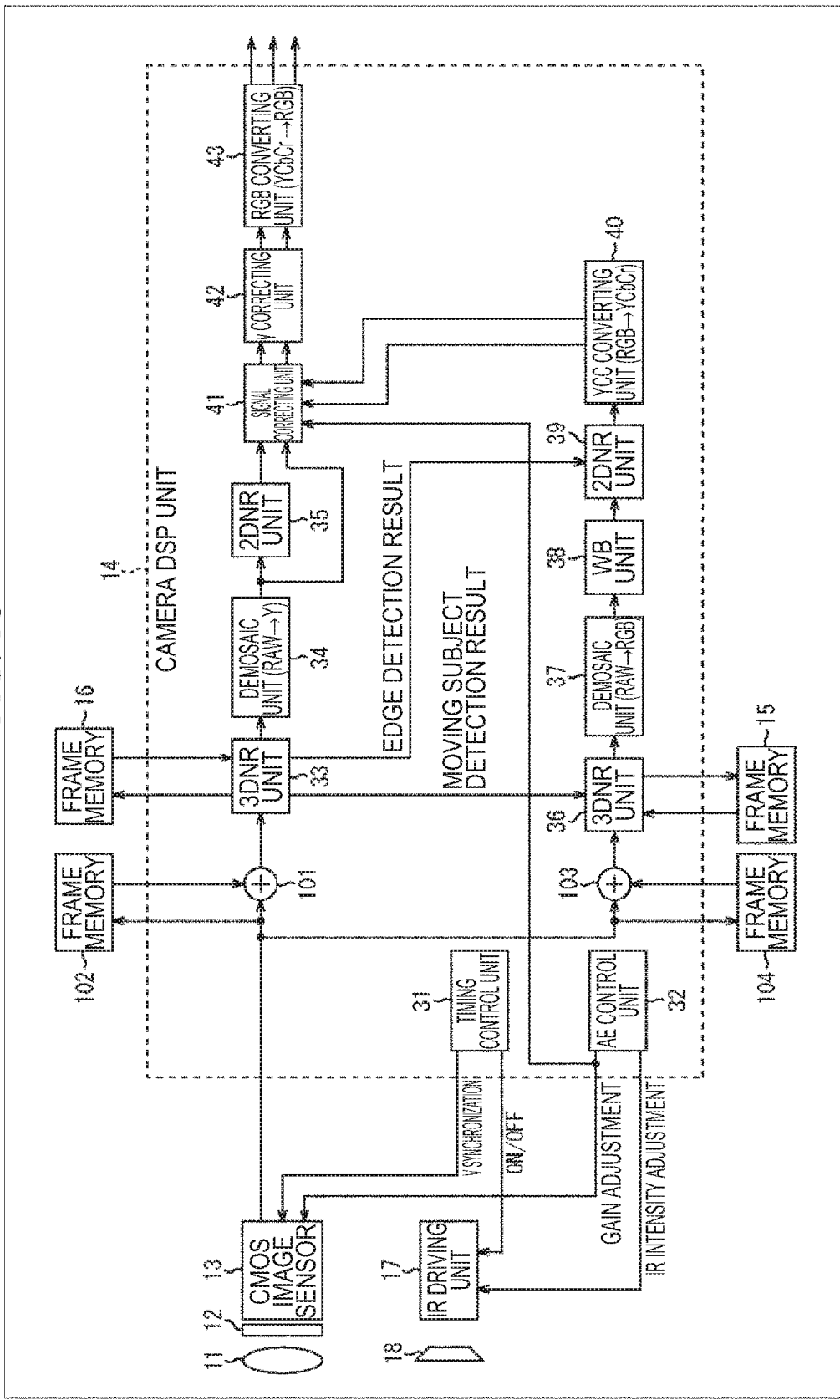
FIG. 18 is a block diagram illustrating a second configuration example of a camera DSP unit.

Next, FIG. 18 illustrates a second configuration example of the camera DSP unit 14 corresponding to the second example of the imaging timing illustrated in FIGS. 17(A), (B), (C), and (D).

Figure 6:
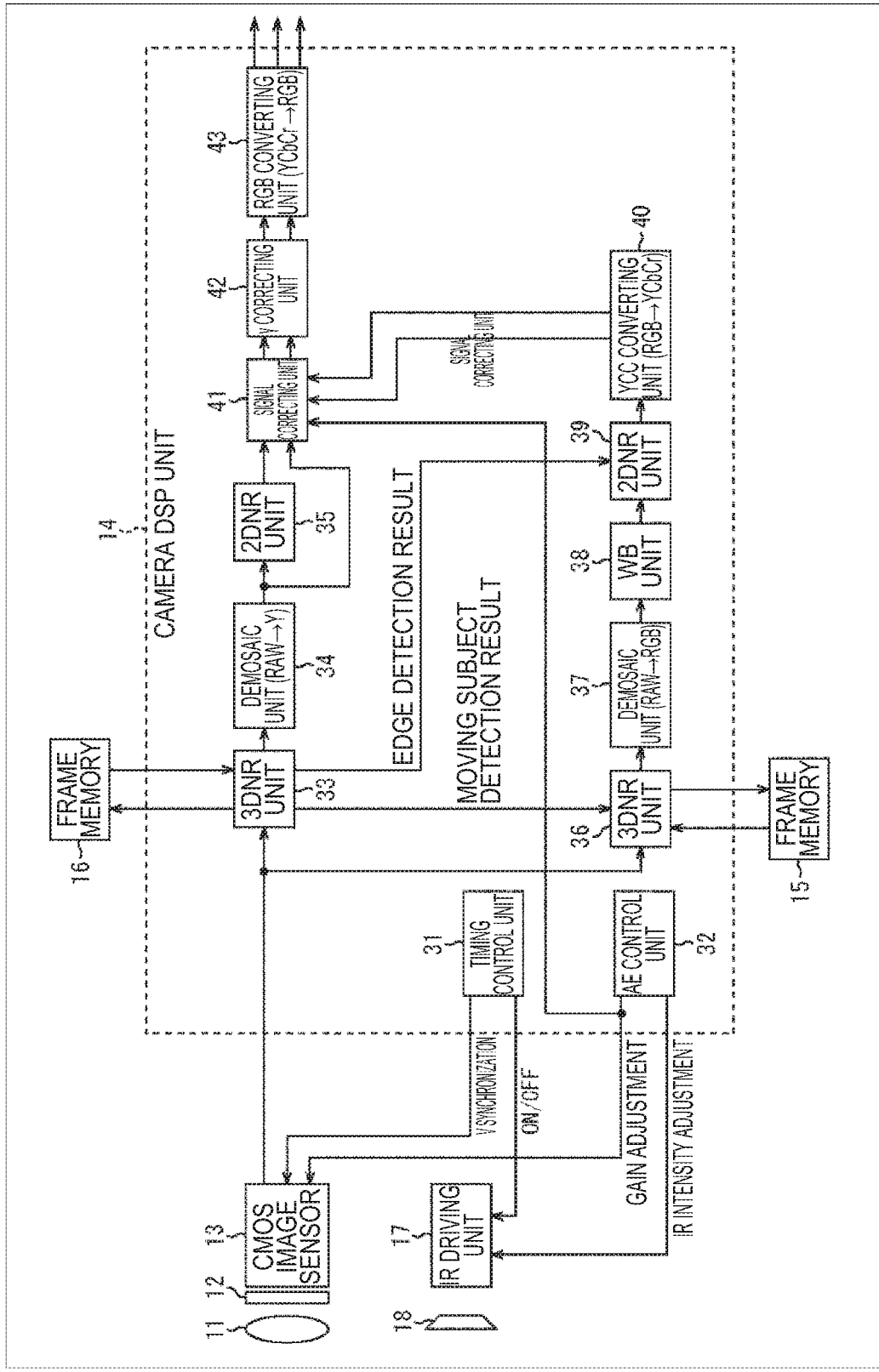
FIG. 6 is a block diagram illustrating a first configuration example of a camera DSP unit.

In the second configuration example, an adding unit 101 and a frame memory 102 are added to a stage before the infrared image processing system of the first configuration example illustrated in FIG. 6, and an adding unit 103 and a frame memory 104 are added to a stage before the visible image processing system.

The adding unit 101 of the infrared image processing system generates the infrared image by adding (or averaging) the sub frame image SF1 and the sub frame image SF2 which are previously input and held in the frame memory 102, and outputs the infrared image to the 3DNR unit 33. The adding unit 103 of the visible image processing system generates the visible image by adding (or averaging) the sub frame image SF3 and the sub frame image SF4 that are previously input and held in the frame memory 104, and outputs the visible image to the 3DNR unit 36.

A configuration of a stage subsequent to the 3DNR unit 33 and a stage subsequent to the 3DNR unit 36 and an operation thereof are similar to those of the first configuration example illustrated in FIG. 6, and thus description thereof is omitted.

According to the second configuration example of the camera DSP unit 14, it is possible to generate the infrared image and the visible image from the sub frame images SF1 to SF4 output from the CMOS 13 of the focal plane reading system and generate the color image having the high degree of color reproduction on the basis of the infrared image and the visible image.

Comparing the first example with the second example for the visible image input to the visible image processing system, in the first example, the exposure time is one sub frame period, whereas in the second example, the exposure time is two sub frame periods which is double. Since the visible image is assumed to be captured with the low illuminance in the present embodiment, even though the exposure time is long, the pixel value is not be saturated, and it is possible to obtain the color information of the subject more accurately as the exposure time increases. Therefore, in the second configuration example, it is possible to obtain the color image in which the color information is reproduced with a higher degree of accuracy than in the first configuration example.

In the second configuration example, the sub frame image SF3 or SF4 may be output to the 3DNR unit 36 as the visible image without using the adding unit 103 and the frame memory 104 of the visible image processing system. In that case, since the exposure time of the visible image is one sub frame period, it is possible to finally obtain the color image in which the color information is reproduced with the same degree of accuracy as in the first configuration example.

<Third Example of Imaging Timing of CMOS 13>

Figure 19:
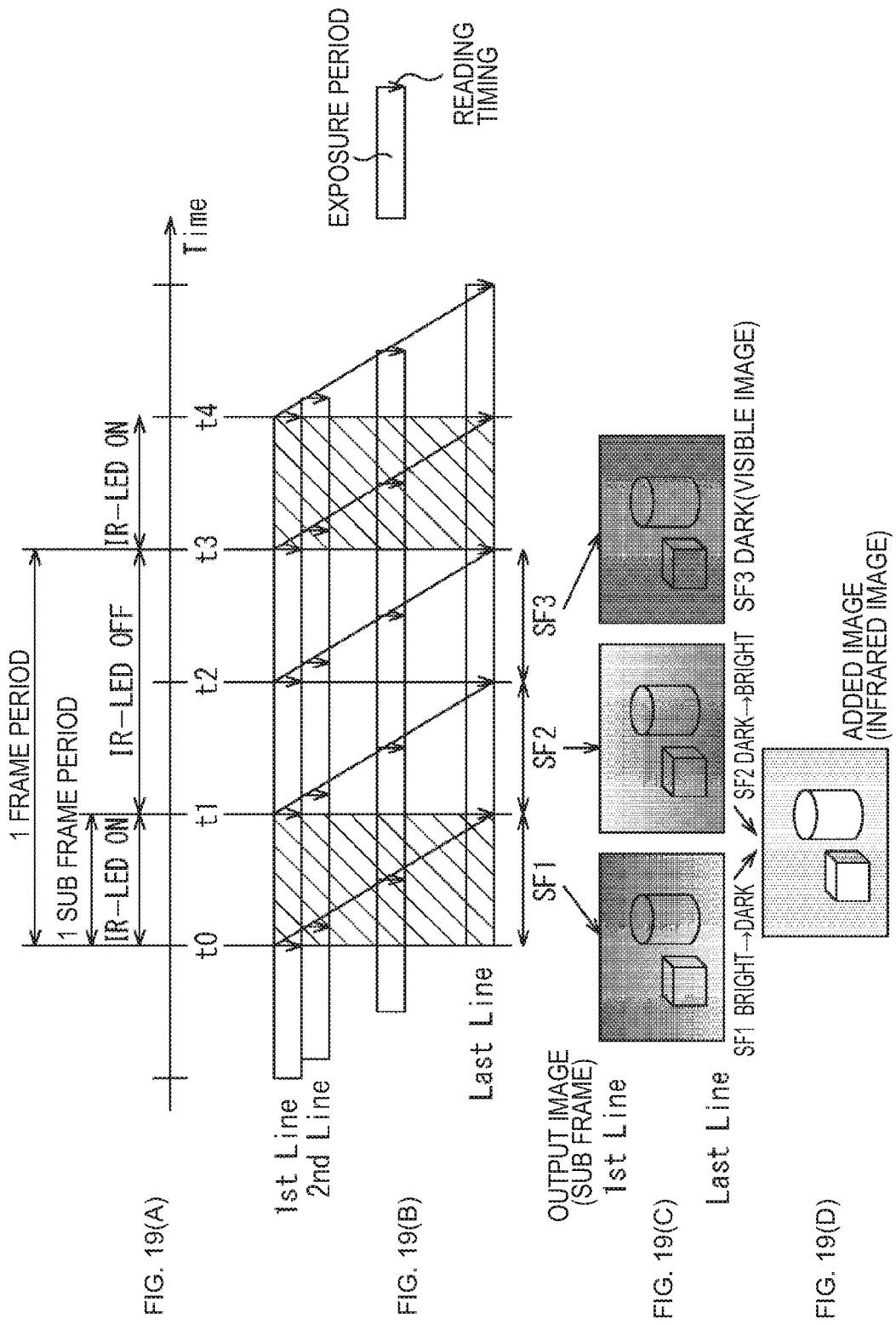
FIGS. 19(A), (B), (C), and (D) are diagrams illustrating a third example of an imaging timing.

Next, FIGS. 19(A), (B), (C), and (D) illustrate a third example of the imaging timing of the CMOS In the third example, In the CMOS 13, one frame period (1/30 seconds in the case of 30 fps) of a frame rate (for example, 30 fps) of a color image to be finally output is divided into three, a sub frame period (1/90 seconds in the case of 30 fps) is set as one screen sweep period of the CMOS 13, and three sub frame images are able to be output from the CMOS 13 in one frame period.

When the three sub frames are imaged in one frame period, the irradiation of the infrared light is turned on in one common sub frame period in each frame period among the three sub frame periods in one frame period, and the irradiation of the infrared light is turned off in the other two sub frame period. In the example of FIGS. 19(A), (B), (C), and (D), the irradiation of the infrared light is turned on in a 1st sub frame period (t0 to t1) in one frame period, but the irradiation of the infrared light may be turned on, for example, in a second or third sub frame period.

In the third example of FIGS. 19(A), (B), (C), and (D), the sub frame image SF1 is an image in which lines near the beginning (1st-Line) of the sweep are dark since an irradiation ON time of the infrared light occupying in the exposure period is short, and brightness increases gradually as the sweep progresses since the irradiation ON time of the infrared light increases. The sub frame image SF2 is an image in which changes in bright and dark are opposite to those of the sub frame image SF1, and darkness increases gradually as the sweep progresses since the irradiation ON time of the infrared light is decreased. Since sub frame image SF3 is an image in which the entire screen based on only the visible light is dark because the irradiation of the infrared light is turned off over the entire exposure period in all the lines.

In a case in which a time of the state in which the irradiation of the infrared light is turned on in the exposure times of the sub frame image SF1 and the sub frame image SF2 is considered, when both are added, it is possible to obtain an image corresponding to a state in which the infrared light is radiated in the entire period (one sub frame period) of the exposure period in all the lines. Therefore, the infrared image is generated by adding (averaging) corresponding pixels of the sub frame image SF1 and the sub frame image SF2. The remaining sub frame image SF3 is used as the visible image without change.

For the configuration example of the camera DSP unit 14 corresponding to the third example of the imaging timing, the second configuration example described above can be applied. However, the adding unit 103 and the frame memory 104 installed at the stage before the visible image processing system may be omitted.

In this case, the camera DSP unit 14 is able to generate the color image with the high degree of color reproduction on the basis of the sub frame images SF1 to SF3 output from the CMOS 13 of the focal plane reading system.

Here, comparing the first example with the third example for the visible image input to the visible image processing system, in the first example, one sub frame period serving as the exposure time is ¼ of the frame period, whereas in the third example, the exposure time is ⅓ of the frame period. Here, if the frame rate is common to the first example and the third example, in the third example, the exposure time of the visible image is longer than in the first example. Since the visible image is assumed to be captured with the low illuminance in the present embodiment, even though the exposure time is long, the pixel value is not be saturated, and it is possible to obtain the color information of the subject more accurately as the exposure time increases. Therefore, in this case, it is possible to obtain the color image in which the color information is reproduced with a higher degree of accuracy than in the first example.

Further, if the time of the sub frame period is common to the first example and the third example, in the third example, it is possible to output the color image at a higher frame rate than in the first example. For example, in a case in which the common sub frame period is $\frac{1}{120}$ seconds, in the first example, the frame rate of the color image is 30 fps, whereas in the third example, the frame rate of the color image is 40 fps.

<Fourth Example of Imaging Timing of CMOS 13>

In the first to third examples of the imaging timing described above, an electronic shutter of the CMOS 13 is kept open (the exposure period and the screen sweep period are caused to coincide), but it is also possible to open and close the electronic shutter.

Figure 20:
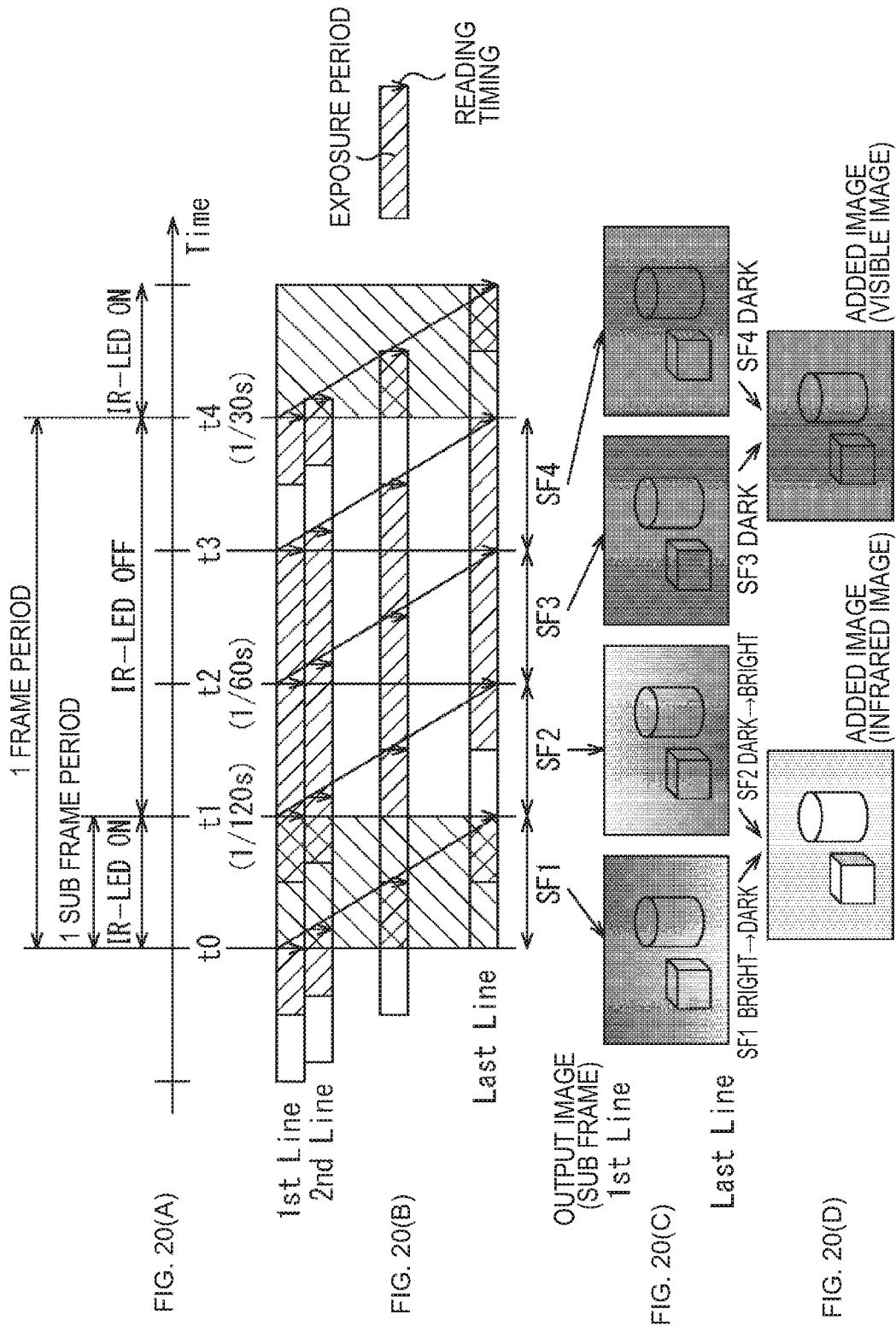
FIGS. 20(A), (B), (C), and (D) are diagrams illustrating a fourth example of an imaging timing.

FIGS. 20(A), (B), (C), and (D) illustrate a fourth example of an imaging timing for adaptively opening and closing the electronic shutter of the CMOS 13. For example, in a case in which the visible image is captured with low illuminance, if the infrared image is captured in a state in which the electronic shutter is opened to get sensitivity, it is possible to reduce the exposure time to be smaller than one screen operation period through the electronic shutter in accordance with brightness of the screen.

It is possible to generate the color image through the second configuration example of the camera DSP unit 14 from the four sub frame images SF1 to SF4 obtained at intervals of one frame period in accordance with the fourth example of the imaging timing.

<Fifth Example of Imaging Timing by CMOS 13>

In the first to fourth examples of the imaging timing described above, the ON and OFF timings of the irradiation of the infrared light are caused to coincide with the delimiter of the sub frame period, but both need not necessarily coincide with each other.

Figure 21:
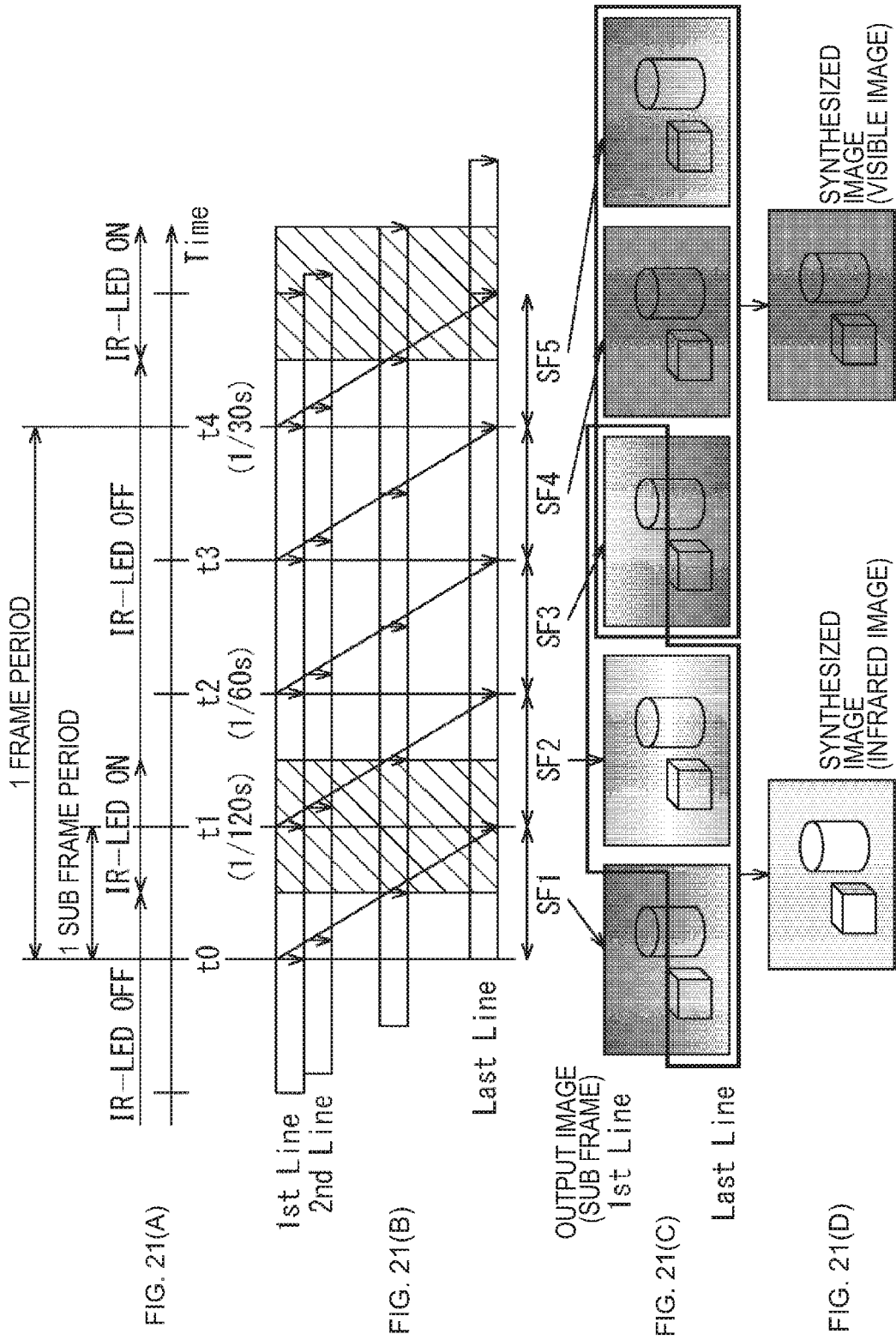
FIGS. 21(A), (B), (C), and (D) are diagrams illustrating a fifth example of an imaging timing.

FIGS. 21(A), (B), (C), and (D) illustrate a fifth example of the imaging timing in which the ON and OFF timings of the irradiation of the infrared light are caused not to coincide with the delimiter of the sub frame period.

In the fifth example, the irradiation of the infrared light is turned on for a period of time corresponding to one sub frame period at an arbitrary timing in one frame period including four sub frame periods in one frame period, and the irradiation of the infrared light is turned off for a period of time corresponding to the other three sub frame periods. In the example of FIGS. 21(A), (B), (C), and (D), the irradiation of the infrared light is turned on for a period of time corresponding to one sub frame period from the middle of the first sub frame period (t0 to t1) to the middle of the second sub frame period (t1 to t2) in one frame period, but the irradiation of the infrared light may be turned on for a period of time corresponding to one sub frame period of another timing.

In the fifth example of FIGS. 21(A), (B), (C), and (D), the sub frame image SF1 is an image in which the irradiation of the infrared light is turned off from the beginning (1st-Line) of the sweep to the line near the center, and the period of time in which the irradiation of the infrared light is turned on increases from the line near the center, and thus the brightness increases gradually.

The sub frame image SF2 is an image in which the period of time in which the irradiation of the infrared light is turned on increases from the beginning (1st-Line) of the sweep to the line near the center, and the period of time in which the irradiation of the infrared light is turned on decreases from the line near the center to the last line (Last-Line) of the sweep, and thus the brightness increases gradually from the beginning of the sweep to the line near the center, the line near the center is brightest, and the brightness decreases gradually as the sweep progresses.

The sub frame image SF4 is an image in which the entire screen based on only the visible light is dark because the irradiation of the infrared light is turned off over the entire exposure period in all the lines.

The camera DSP unit 14 synthesizes the infrared image by adding (averaging) the lower half of the sub frame image SF1, the entire sub frame image SF2, and the lower half of the sub frame image SF3, and uses the infrared image as a processing target of the infrared image processing system.

Further, the camera DSP unit 14 synthesizes the visible image by adding (averaging) the sub frame image SF3, the sub frame image SF4, and a sub frame image SF5 (the sub frame image SF1 of the next frame period), and uses the infrared image as a processing target of the visible image processing system.

However, the visible image may be synthesized by adding (averaging) the lower half of the sub frame image SF3, the sub frame image SF4, and the upper half of the sub frame image SF5, similar to the synthesis of the infrared image. However, since a component of the infrared light is included in the sub frame image SF3 and sub frame image SF5, it is unable to be used for the synthesis of the visible image without change. As a countermeasure, the RGB-IR filter 81 or the RGB-W filter 82 illustrated in FIGS. 16A and B may be employed in the CMOS 13. In this case, the component of the visible light can be extracted by performing the IR signal subtraction process (the process of subtracting the IR signal from the RGB signal). Therefore, the component of the visible light is extracted from the sub frame image SF3 and the sub frame image SF5 through the IR signal subtraction process and used for the synthesis of the visible image.

In the case of the fifth example, since the visible image is obtained by synthesizing the three sub frame images, the exposure time is substantially three sub frame periods and 1.5 times as large as the exposure time of the visible image of the second or third example. Since the visible image is assumed to be captured with the low illuminance in the present embodiment, even though the exposure time is long, the pixel value is not be saturated, and it is possible to obtain the color information of the subject more accurately as the exposure time increases. Thus, in the fifth example, it is possible to obtain the color image in which the color information is reproduced with a higher degree of accuracy than in the second or third example.

Generally, if the component of the infrared light is larger than the component of the visible light in an image, the accuracy of subtraction deteriorates in the IR signal subtraction process, and the noise of the component of the visible light increases, but as in the fifth example, both of the components of the infrared light in the upper part of the sub frame image SF3 and the lower part of the sub frame image SF5 correspond to a timing close to a timing at which the irradiation of the infrared light is turned on or off, the component of the infrared light is weaker than the sub frame image SF2. Therefore, it is possible to extract the component of the visible light with a high degree of accuracy even in the IR signal subtraction process.

Further, in the upper part of the sub frame image SF3 and the lower part of the sub frame image SF5, the intensity of the component of the infrared light in the center part of the image is weaker than the upper end or the lower end of the image, and thus it is possible to improve the quality of the component of the visible light in the center part which is most important as the image.

<Modified Example Related to Generation of Color Image>

In the above embodiment, the color information used for the generation of the color image is extracted from only the visible image, but the color component may be extracted even from the infrared image and used for generating the color image. Specifically, if the RGB-IR filter 81 illustrated in FIG. 16A is employed in the CMOS 13, and the IR signal subtraction process is performed on the infrared image, it is possible to extract the color information of only the visible light. It is possible to obtain the color image with the higher color reproducibility by combining the color information extracted from the infrared light with the color information extracted from the visible image and use the combined information for the generation of the color image.

In the above embodiment, one frame period is divided into the three sub frame periods or the four sub frame periods, but one frame period may be divided into five or more sub frame periods, the infrared image and the visible image may be synthesized from the obtained sub frame images, and the color images may be generated on the basis of the infrared image and the visible image.

<Modified Example of Parameter Indicating Brightness of Subject of Visible Image or Photographing Environment>

In the above embodiment, the example in which the modulation coefficient Yratio is corrected using the gain VPGA of the analog gain amplifier 23 of the CMOS 13 as a parameter indicating the brightness of the subject of the visible image or the brightness of the photographing environment has been described, but other parameters may be used. For example, a measured value of the brightness of the subject of visible image or the brightness of the photographing environment measured by an exposure meter or the like installed inside or outside the imaging device 10 may be used.

<Modified Example of Unit in which Setting and Correction of Modulation Coefficient are Performed>

In the above embodiment, the example in which the setting and correction of the modulation coefficients is performed in units of pixels has been described, but, for example, the setting and correction of the modulation coefficients may be performed in units of blocks or frames including with a plurality of pixels.

<Application Example to Monochrome Image>

In the above embodiment, the example in which the present disclosure is applied to the generation of the color image has been described, but the present disclosure can also be applied to generation of monochrome images. An image including the luminance information Ysys which has undergone the γ correction process and has been output from the γ correcting unit 42 may be used as the monochrome image. Therefore, in a case in which only the monochrome image is generated without generating the color image, for example, the RGB converting unit 43 of FIGS. 6 and 18 may be deleted.

Further, for example, the imaging device 10 may output the color image generated by the RGB converting unit 43 to the outside in the day mode and output the monochrome image including the luminance information Ysys which has undergone the γ correction process output from the γ correcting unit 42 to the outside in the night mode.

For example, an image including the infrared luminance information Yir output from the demosaic unit 34 may be used as the monochrome image. However, in this case, for example, if a subject with high reflectance of infrared light such as cotton clothing is photographed, dark clothing such as black clothing or navy blue clothing may shine white. As a result, for example, since there is no difference in the reflectance for the infrared light although colors are different, there may be a problem in that a pattern of clothing is unable to be determined.

On the other hand, when the image including the luminance information Ysys obtained by correcting the infrared luminance information Yir is used as the monochrome image, it is possible to acquire an image having a similar contrast to that when the visible image is converted into a monochrome image.

Other Modified Examples

In the above embodiment, the example in which the chrominance information Cb_NR and Cr_NR is corrected using the modulation coefficient Yratio_c, and the γ correction is further performed has been described, but these correction processes may be omitted.

Other Application Examples

The present disclosure is not limited to the above embodiment and can be widely applied in a case in which a color image or a monochrome image is generated from an infrared image and a visible image. For example, the present disclosure can also be applied to an image processing device that has no imaging function and generates a color image or a monochrome image from a visible image and an infrared image. The present disclosure can also be applied, for example, in a case in which a color image or a monochrome image is generated from a visible image and an infrared image captured by different imaging devices.

A series of processes described above can be executed by hardware or software. When a series of processes is executed by software, a program constituting the software is installed in a computer. Here, examples of the computer include a computer incorporated in dedicated hardware and a general-purpose personal computer which is capable of executing various kinds of functions when various kinds of programs are installed therein.

Figure 22:
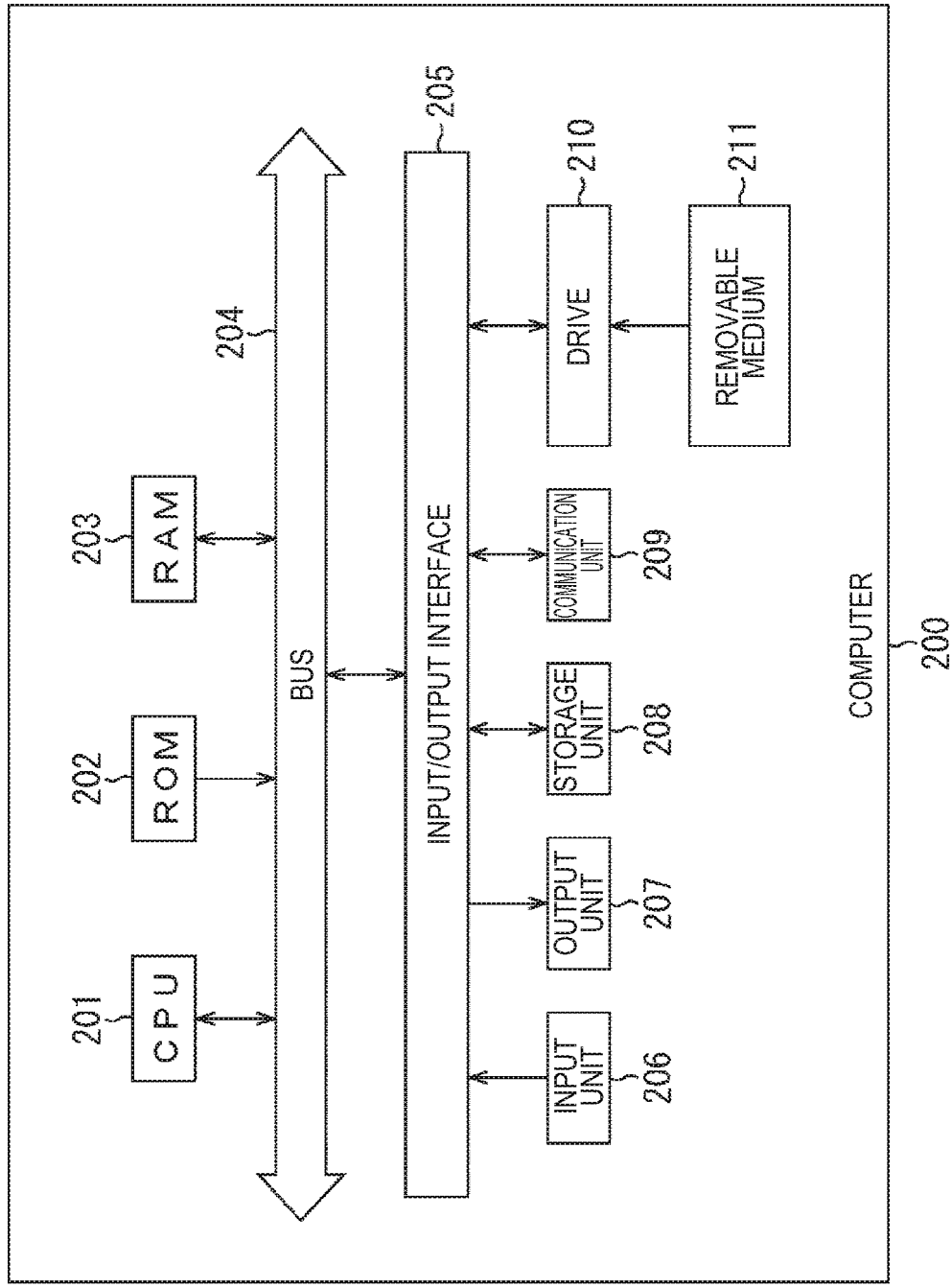
FIG. 22 is a block diagram illustrating a configuration example of a computer.

FIG. 22 is a block diagram illustrating an exemplary hardware configuration of a computer that executes a series of processing described above by a program.

In this computer 200, a central processing unit (CPU) 201, a read only memory (ROM) 202, and a random access memory (RAM) 203 are connected to one another by a bus 204.

An input/output interface 205 is further connected to the bus 204. An input unit 206, an output unit 207, a storage unit 208, a communication unit 209, and a drive 210 are connected to the input/output interface 205.

The input unit 206 includes a keyboard, a mouse, a microphone, or the like. The output unit 207 includes a display, a speaker, or the like. The storage unit 208 includes a hard disk, a nonvolatile memory, or the like. The communication unit 209 includes a network interface or the like. The drive 210 drives a removable medium 911 such as a magnetic disk, an optical disk, a magneto-optical disk, or a semiconductor memory.

In the computer 200 configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer 200 (the CPU 201) are provided being recorded in the removable medium 211 which is a packaged medium or the like. Also, programs may be provided via a wired or wireless transmission medium, such as a local area network, the Internet or digital satellite broadcasting.

In the computer 200, by inserting the removable medium 911 into the drive 910, the program can be installed in the storage unit 908 via the input/output interface 905. Further, the program can be received by the communication unit 909 via a wired or wireless transmission medium and installed in the storage unit 908. Moreover, the program can be installed in advance in the ROM 902 or the storage unit 908.

An embodiment of the disclosure is not limited to the embodiments described above, and various changes and modifications may be made without departing from the scope of the disclosure.

Additionally, the present technology may also be configured as below.

(1)

An image processing device, including:

a modulation coefficient setting unit configured to set a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated;

a modulation coefficient correcting unit configured to correct the first modulation coefficient to a second modulation coefficient on the basis of a parameter indicating brightness of a subject of the visible image or brightness of a photographing environment; and a luminance correcting unit configured to correct the infrared luminance information using the second modulation coefficient.

(2)

The image processing device according to (1), in which the modulation coefficient correcting unit calculates the second modulation coefficient by synthesizing the first modulation coefficient with a third modulation coefficient in a case in which the infrared luminance information is not corrected, with a ratio based on the parameter.

(3)

The image processing device according to (1), in which the modulation coefficient correcting unit converts the first modulation coefficient into the second modulation coefficient through a predetermined non-linear function in a case in which the brightness of the subject of the visible image or the brightness of the photographing environment is determined to be less than a predetermined threshold value on the basis of the parameter.

(4)

The image processing device according to (1), in which the modulation coefficient correcting unit calculates the second modulation coefficient by synthesizing a third modulation coefficient obtained by converting the first modulation coefficient through a predetermined first function with a fourth modulation coefficient obtained by converting the first modulation coefficient through a predetermined second function, with a ratio based on the parameter.

(5)

The image processing device according to (4), in which the modulation coefficient correcting unit selects a combination of the first function and the second function from among a plurality of functions on the basis of the parameter.

(6)

The image processing device according to (5), in which the plurality of functions include a predetermined non-linear function and at least one of a function in which the fourth modulation coefficient is equal to the first modulation coefficient and a function in which the modulation coefficient is 1.

(7)

The image processing device according to any one of (1) to (6), in which the modulation coefficient correcting unit limits a lower limit value of the second modulation coefficient on the basis of the parameter in a case in which the brightness of the subject of the visible image or the brightness of the photographing environment is determined to be less than a predetermined threshold value on the basis of the parameter.

(8)

The image processing device according to any one of (1) to (7), in which the modulation coefficient correcting unit limits an upper limit value of the second modulation coefficient on the basis of the parameter in a case in which the visible luminance information is larger than the infrared luminance information.

(9)

The image processing device according to any one of (1) to (8), in which the parameter is a gain adjusted by exposure control for the visible image.

(10)

The image processing device according to any one of (1) to (8), in which the parameter is a measured value of the brightness of the subject of the visible image or the brightness of the photographing environment.

(11)

The image processing device according to any one of (1) to (10), in which the modulation coefficient setting unit sets the first modulation coefficient on the basis of a ratio between a low frequency component of the infrared luminance information and a low frequency component of the visible luminance information.

(12)

The image processing device according to any one of (1) to (11), further including a color image converting unit configured to convert the corrected infrared luminance information and chrominance information of the visible image into color information of a color image.

(13)

The image processing device according to (12), further including a chrominance correcting unit configured to correct the chrominance information using the second modulation coefficient, in which the color correcting unit converts the corrected infrared luminance information and the corrected chrominance information into the color information of the color image.

(14)

The image processing device according to any one of (1) to (13), further including:

an infrared image converting unit configured to extract the infrared luminance information from the infrared image; and a visible image converting unit configured to extract the visible luminance information from the visible image.

(15)

An image processing method, including:

a modulation coefficient setting step of setting a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated;

a modulation coefficient correcting step of correcting the first modulation coefficient to a second modulation coefficient on the basis of a parameter indicating brightness of a subject of the visible image or brightness of a photographing environment; and a luminance correcting step of correcting the infrared luminance information using the second modulation coefficient.

(16)

A program causing a computer to execute processing including:

a modulation coefficient setting step of setting a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated;

a modulation coefficient correcting step of correcting the first modulation coefficient to a second modulation coefficient on the basis of a parameter indicating brightness of a subject of the visible image or brightness of a photographing environment; and a luminance correcting step of correcting the infrared luminance information using the second modulation coefficient.

(17)

An imaging device, including:

an imaging element;

an infrared light irradiation control unit configured to perform control such that irradiation of an imaging range with infrared light is turned on or off;

a modulation coefficient setting unit configured to set a first modulation coefficient used for correction of infrared luminance information, which is luminance information of an infrared image obtained in a state in which infrared light is radiated, on the basis of a ratio between the infrared luminance information and visible luminance information, which is luminance information of a visible image obtained in a state in which the infrared light is not radiated;

a modulation coefficient correcting unit configured to correct the first modulation coefficient to a second modulation coefficient on the basis of a parameter indicating brightness of a subject of the visible image or brightness of a photographing environment; and a luminance correcting unit configured to correct the infrared luminance information using the second modulation coefficient.

(18)

The imaging device according to (17), in which the imaging element divides one frame period corresponding to a predetermined frame rate into three or more sub frame periods, and sweeps pixel values corresponding to the entire screen through a focal plane reading system at intervals of the sub frame periods, to generate sub frame images which are equal in number to the sub frame periods in the one frame period, and the infrared light irradiation control unit performs control such that the irradiation of the imaging range with the infrared light is turned on or off in units of the same time length unit as the sub frame period in the one frame period.

(19)

The imaging device according to (18), further including:

an infrared image generating unit configured to generate the infrared image from a plurality of sub frame images in which a period in which the infrared light is radiated is included in an exposure time; and a visible image generating unit configured to generate the visible image from a plurality of sub frame images in which a period in which the infrared light is radiated is not included in an exposure time.

(20)

The imaging device according to any one of (17) to (19), further including a color image converting unit configured to convert the corrected infrared luminance information and chrominance information of the visible image into color information of a color image.

REFERENCE SIGNS LIST 10 imaging device
13 CMOS image sensor
14 camera DSP unit
17 IR driving unit
18 IR irradiating unit
23 analog gain amplifier
31 timing control unit
32 AE control unit
35 2DNR unit
39 2DNR unit
40 YCC converting unit
41 signal correcting unit
42 γ correcting unit
43 RGB converting unit
51 modulation coefficient setting unit
52 modulation coefficient correcting unit
53 luminance correcting unit
54 chrominance correcting unit

The invention claimed is:

1. An image processing device, comprising:
circuitry configured to:
set a first modulation coefficient used for correction of infrared luminance information of an infrared image obtained in a state in which infrared light is radiated, wherein
the first modulation coefficient is set based on a first ratio between the infrared luminance information and visible luminance information of a visible image obtained in a state in which the infrared light is not radiated;
correct the first modulation coefficient to a second modulation coefficient based on a parameter indicating brightness of a subject of the visible image or brightness of a photographing environment; and
correct the infrared luminance information based on the second modulation coefficient.

2. The image processing device according to claim 1, wherein
the circuitry is further configured to calculate the second modulation coefficient based on synthesis of the first modulation coefficient with a third modulation coefficient in a case in which the infrared luminance information is not corrected,
the synthesis of the first modulation coefficient with the third modulation coefficient is based on a second ratio, and
the second ratio is calculated based on the parameter.

3. The image processing device according to claim 1, wherein the circuitry is further configured to convert the first modulation coefficient into the second modulation coefficient based on a first non-linear function in a case in which the brightness of the subject of the visible image or the brightness of the photographing environment is determined to be less than a threshold value.

4. The image processing device according to claim 1, wherein
the circuitry is further configured to calculate the second modulation coefficient based on synthesis of a fourth modulation coefficient with a fifth modulation coefficient,
the fourth modulation coefficient is obtained based on conversion of the first modulation coefficient through a first linear function,
the fifth modulation coefficient is obtained based on conversion of the first modulation coefficient through a second non-linear function,
the synthesis of the fourth modulation coefficient with the fifth modulation coefficient is based on a third ratio, and
the third ratio is calculated based on the parameter.

5. The image processing device according to claim 4, wherein the circuitry is further configured to select a combination of the first linear function and the second non-linear function from among a plurality of functions based on the parameter.

6. The image processing device according to claim 5, wherein the plurality of functions includes a non-linear function and at least one of a linear function in which the fourth modulation coefficient is equal to the first modulation coefficient and a linear function in which the fourth modulation coefficient is 1.

7. The image processing device according to claim 1, wherein the circuitry is further configured to limit a lower limit value of the second modulation coefficient based on the parameter in a case in which the brightness of the subject of the visible image or the brightness of the photographing environment is determined to be less than a threshold value.

8. The image processing device according to claim 1, wherein the circuitry is further configured to limit an upper limit value of the second modulation coefficient based on the parameter in a case in which the visible luminance information is larger than the infrared luminance information.

9. The image processing device according to claim 1, wherein the parameter is a gain adjusted by exposure control for the visible image.

10. The image processing device according to claim 1, wherein the parameter is a measured value of the brightness of the subject of the visible image or the brightness of the photographing environment.

11. The image processing device according to claim 1, wherein the circuitry is further configured to set the first modulation coefficient based on a ratio between a low frequency component of the infrared luminance information and a low frequency component of the visible luminance information.

12. The image processing device according to claim 1, wherein the circuitry is further configured to convert the corrected infrared luminance information and chrominance information of the visible image into color information of a color image.

13. The image processing device according to claim 12, wherein the circuitry is further configured to:
correct the chrominance information based on the second modulation coefficient; and convert the corrected infrared luminance information and the corrected chrominance information into the color information of the color image.

14. The image processing device according to claim 1, wherein the circuitry is further configured to:
    extract the infrared luminance information from the infrared image; and
    extract the visible luminance information from the visible image.

15. An image processing method, comprising:
    setting a first modulation coefficient used for correction of infrared luminance information of an infrared image obtained in a state in which infrared light is radiated, wherein
    the first modulation coefficient is set based on a ratio between the infrared luminance information and visible luminance information of a visible image obtained in a state in which the infrared light is not radiated;
    correcting the first modulation coefficient to a second modulation coefficient based on a parameter indicating brightness of a subject of the visible image or brightness of a photographing environment; and
    correcting the infrared luminance information based on the second modulation coefficient.

16. A non-transitory computer-readable medium having stored thereon, computer-executable instructions which, when executed by a computer, cause the computer to execute operations comprising:
    setting a first modulation coefficient used for correction of infrared luminance information of an infrared image obtained in a state in which infrared light is radiated, wherein
    the first modulation coefficient is set based on a ratio between the infrared luminance information and visible luminance information of a visible image obtained in a state in which the infrared light is not radiated;
    correcting the first modulation coefficient to a second modulation coefficient based on a parameter indicating brightness of a subject of the visible image or brightness of a photographing environment; and
    correcting the infrared luminance information based on the second modulation coefficient.

17. An imaging device, comprising:
    an imaging element;
    an infrared light irradiation control unit configured to control turn on or off of irradiation of an imaging range with infrared light; and
    circuitry configured to:
        set a first modulation coefficient used for correction of infrared luminance information of an infrared image obtained in a state in which infrared light is radiated, wherein
        the first modulation coefficient is set based on a ratio between the infrared luminance information and visible luminance information of a visible image obtained in a state in which the infrared light is not radiated;
        correct the first modulation coefficient to a second modulation coefficient based on a parameter indicating brightness of a subject of the visible image or brightness of a photographing environment; and
        correct the infrared luminance information based on the second modulation coefficient.

18. The imaging device according to claim 17, wherein the imaging element is configured to:
    divide one frame period corresponding to a frame rate into three or more sub frame periods;
    sweep pixel values corresponding to an entire screen through a focal plane reading system at intervals of the three or more sub frame periods; and
    generate sub frame images which are equal in number to a number of sub frame periods in the one frame period, and
    the infrared light irradiation control unit is further configured to control the turn on or off of the irradiation of the imaging range with the infrared light in units of a same time length unit as a sub frame period of the three or more sub frame periods in the one frame period.

19. The imaging device according to claim 18, further comprising:
    an infrared image generating unit configured to generate the infrared image from a plurality of sub frame images in which a period in which the infrared light is radiated is included in an exposure time; and
    a visible image generating unit configured to generate the visible image from a plurality of sub frame images in which a period in which the infrared light is radiated is not included in an exposure time.

20. The imaging device according to claim 17, wherein the circuitry is further configured to convert the corrected infrared luminance information and chrominance information of the visible image into color information of a color image.

* * * * *